US012322154B2

(12) United States Patent
Deng

(10) Patent No.: US 12,322,154 B2
(45) Date of Patent: *Jun. 3, 2025

(54) AUTOMATED FACIAL RECOGNITION LIBRARY CONSTRUCTION WITH PRIVACY PROTECTION

(71) Applicant: The Nielsen Company (US), LLC, New York, NY (US)

(72) Inventor: Kevin Keqiang Deng, Oldsmar, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,273

(22) Filed: May 3, 2024

(65) Prior Publication Data

US 2024/0290070 A1  Aug. 29, 2024

Related U.S. Application Data

(63) Continuation of application No. 17/558,991, filed on Dec. 22, 2021, now Pat. No. 12,008,798.

(51) Int. Cl.
*G06K 9/00* (2022.01)
*G06F 21/62* (2013.01)
*G06V 10/762* (2022.01)

(52) U.S. Cl.
CPC ........ *G06V 10/762* (2022.01); *G06F 21/6254* (2013.01)

(58) Field of Classification Search
CPC .... G06V 40/172; G06V 10/82; G06V 40/161; G06V 10/764; G06V 40/168; G06V 40/50; G06V 10/454; G06V 10/762; G06V 40/166; G06V 40/171; G06V 10/242; G06V 10/30; G06V 10/32; G06V 10/44; G06V 10/761; G06V 10/763; G06V 10/7715; G06V 30/191; G06V 40/70; G06N 3/045;

(Continued)

(56) References Cited

U.S. PATENT DOCUMENTS 11,222,196 B2 * 1/2022 Savchenko ............... G06N 3/08
11,705,133 B1 * 7/2023 Aggarwal ............ G06V 40/172
704/246

(Continued)

*Primary Examiner* — Dhaval V Patel
(74) *Attorney, Agent, or Firm* — McDonnell Boehnen Hulbert & Berghoff LLP

(57) ABSTRACT

Methods and systems for automated construction of an anonymized facial recognition library are disclosed. A camera of a client device may capture a first plurality of images of faces of members of a panel of viewers of media content presented on a content presentation device collocated with the client device during viewing sessions. A first machine learning (ML) model may be applied to the first plurality to generate a second plurality of feature vectors, each associated with a different one of the images. One or more clusters of feature vectors of the second plurality may be computationally determined within a vector space of the feature vectors. A respective centroid feature vector may be determined for each respective cluster, and assigned a unique ID. A respective association between each cluster ID and a respective name ID may be determined based on panel-member information received at the client device.

20 Claims, 8 Drawing Sheets

(58) Field of Classification Search
CPC ...... G06N 3/08; G06N 3/02; G06K 19/06037; G06T 2207/20084; G06T 2207/30201; G06T 3/02; G06T 5/50; G06T 5/70; G06T 7/73
See application file for complete search history.

(56) References Cited

U.S. PATENT DOCUMENTS

| | | |
|---|---|---|
| 2019/0188452 A1 | 6/2019 | Chen |
| 2020/0019759 A1 | 1/2020 | Savchenko |
| 2020/0279424 A1* | 9/2020 | Uratani ................. G06V 20/30 |
| 2021/0150186 A1* | 5/2021 | Lehman ............... G06V 40/171 |
| 2021/0272295 A1* | 9/2021 | Ahmadi ................. G06F 18/23 |
| 2022/0075996 A1* | 3/2022 | Jian ................. G06Q 20/40145 |
| 2022/0343020 A1 | 10/2022 | Farre Guiu et al. |
| 2022/0398717 A1* | 12/2022 | Hébert et al. ........ A61N 5/1037 |
| 2023/0169792 A1 | 6/2023 | Huang et al. |
| 2023/0206700 A1 | 6/2023 | Khan et al. |

\* cited by examiner

Viewer Panel Demographic Data 300

Panel ID: G-8374    Geographic Region: Mid-Atlantic

| Name | Name ID | Age | Height | Gender ID | Education | Occupation | Salary |
|---|---|---|---|---|---|---|---|
| Fred | G1 | 76 | 5'9" | M | M.S. | Retired | $RRR |
| Tom | G2 | 40 | 5'11" | M | B.S. | Teacher | $ABC |
| Sally | G3 | 38 | 5'6" | F | M.D. | Doctor | $XYZ |
| Kim | G4 | 8 | 3'6" | F | Grade 3 | Student | N/A |
| Molly | G5 | 5 | 2'11" | F | K | Student | N/A |

Anonymized ID Look-up 114

Panel ID: G-8374

| Name ID | Photo-Cluster IDs |
|---|---|
| G1 | (1, 2) |
| G2 | (3, 4, 7) |
| G3 | (5, 6) |
| G4 | (8, 11) |
| G5 | (9, 10) |

Audience Report 101

Panel ID: G-8374

| Session Programming Information |
|---|
| Panel Members Detected |
| Photo-Cluster IDs Detected |
| Panel Member IDs Detected |

Anonymized Facial Recognition Library 108

Panel ID: G-8374

| Photo-Cluster IDs | Cluster Centroid Feature Vector |
|---|---|
| 1 | FVC_1{$x_1, x_2, \ldots, x_n$} |
| 2 | FVC_2{$x_1, x_2, \ldots, x_n$} |
| 3 | FVC_3{$x_1, x_2, \ldots, x_n$} |
| 4 | FVC_4{$x_1, x_2, \ldots, x_n$} |
| 5 | FVC_5{$x_1, x_2, \ldots, x_n$} |
| 6 | FVC_6{$x_1, x_2, \ldots, x_n$} |
| 7 | FVC_7{$x_1, x_2, \ldots, x_n$} |
| 8 | FVC_8{$x_1, x_2, \ldots, x_n$} |
| 9 | FVC_9{$x_1, x_2, \ldots, x_n$} |
| 10 | FVC_10{$x_1, x_2, \ldots, x_n$} |
| 11 | FVC_11{$x_1, x_2, \ldots, x_n$} |

Figure 3

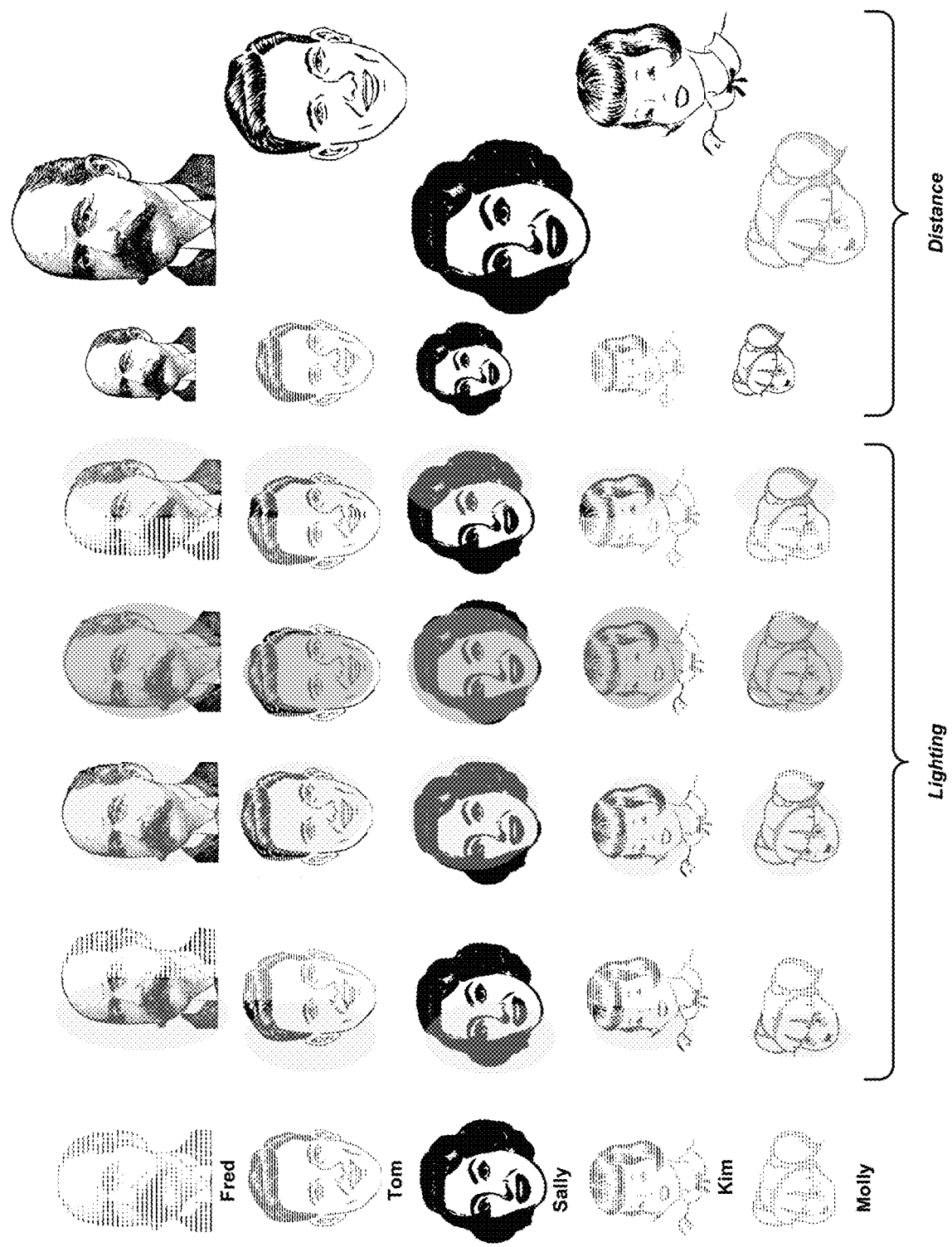

AUTOMATED FACIAL RECOGNITION LIBRARY CONSTRUCTION WITH PRIVACY PROTECTION

REFERENCE TO RELATED APPLICATION

This is a continuation of U.S. patent application Ser. No. 17/558,991, filed Dec. 22, 2021, the entirety of which is hereby incorporated by reference.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method for automated construction of an anonymized facial recognition library carried out by a client device comprising one or more processors and a camera is disclosed. The method may include: with the camera, capturing a first plurality of images of faces of members of a panel of viewers of media content presented on a content presentation device collocated with the client device during one or more viewing sessions carried out over a particular time interval; applying a first machine learning (ML) model implemented on the client device to the first plurality to generate a second plurality of feature vectors, each associated with a different one of the images of the faces, wherein the first ML model is trained to extract facial-image feature vectors from images that contain one or more faces; computationally determining one or more clusters of feature vectors of the second plurality within a vector space of the feature vectors; for each respective cluster in the vector space, determining a respective centroid feature vector marking the center of the respective cluster, and respectively assigning a unique cluster identifier (ID) to the respective centroid feature vector, wherein the anonymized facial recognition library comprises the respective centroid feature vectors and their respectively assigned unique cluster IDs; determining a respective association between each cluster ID and a respective name ID based on panel-member information received at the client device, wherein each respective name ID is unique to a different one of the panel members, and wherein each respective association associates one of the respective name IDs with one or more cluster IDs.

In another aspect, a client device configured for automated construction of an anonymized facial recognition library is disclosed. The client device may include a camera, one or more processors, and memory storing instructions that, when executed by the one or more processors, cause the system to carry out various operations. The operations may include: with the camera, capturing a first plurality of images of faces of members of a panel of viewers of media content presented on a content presentation device collocated with the client device during one or more viewing sessions carried out over a particular time interval; applying a first machine learning (ML) model implemented on the client device to the first plurality to generate a second plurality of feature vectors, each associated with a different one of the images of the faces, wherein the first ML model is trained to extract facial-image feature vectors from images that contain one or more faces; computationally determining one or more clusters of feature vectors of the second plurality within a vector space of the feature vectors; for each respective cluster in the vector space, determining a respective centroid feature vector marking the center of the respective cluster, and respectively assigning a unique cluster identifier (ID) to the respective centroid feature vector, wherein the anonymized facial recognition library comprises the respective centroid feature vectors and their respectively assigned unique cluster IDs; determining a respective association between each cluster ID and a respective name ID based on panel-member information received at the client device, wherein each respective name ID is unique to a different one of the panel members, and wherein each respective association associates one of the respective name IDs with one or more cluster IDs.

In still another aspect, a non-transitory computer-readable medium may store instructions thereon that, when carried out by one or more processors of a client device having a camera, cause the client device to carry out various operations. The operations may include: with the camera, capturing a first plurality of images of faces of members of a panel of viewers of media content presented on a content presentation device collocated with the client device during one or more viewing sessions carried out over a particular time interval; applying a first machine learning (ML) model implemented on the client device to the first plurality to generate a second plurality of feature vectors, each associated with a different one of the images of the faces, wherein the first ML model is trained to extract facial-image feature vectors from images that contain one or more faces; computationally determining one or more clusters of feature vectors of the second plurality within a vector space of the feature vectors; for each respective cluster in the vector space, determining a respective centroid feature vector marking the center of the respective cluster, and respectively assigning a unique cluster identifier (ID) to the respective centroid feature vector, wherein the anonymized facial recognition library comprises the respective centroid feature vectors and their respectively assigned unique cluster IDs; determining a respective association between each cluster ID and a respective name ID based on panel-member information received at the client device, wherein each respective name ID is unique to a different one of the panel members, and wherein each respective association associates one of the respective name IDs with one or more cluster IDs.

BRIEF DESCRIPTION OF THE DRAWINGS

FIG. 3 illustrates example panel demographic information, an example anonymized facial recognition library, and an example audience report, in accordance with example embodiments.

FIG. 4 is a conceptual illustration of facial images acquired under different settings and/or different environmental conditions, in accordance with example embodiments.

DETAILED DESCRIPTION

I. Overview

Figure 1:
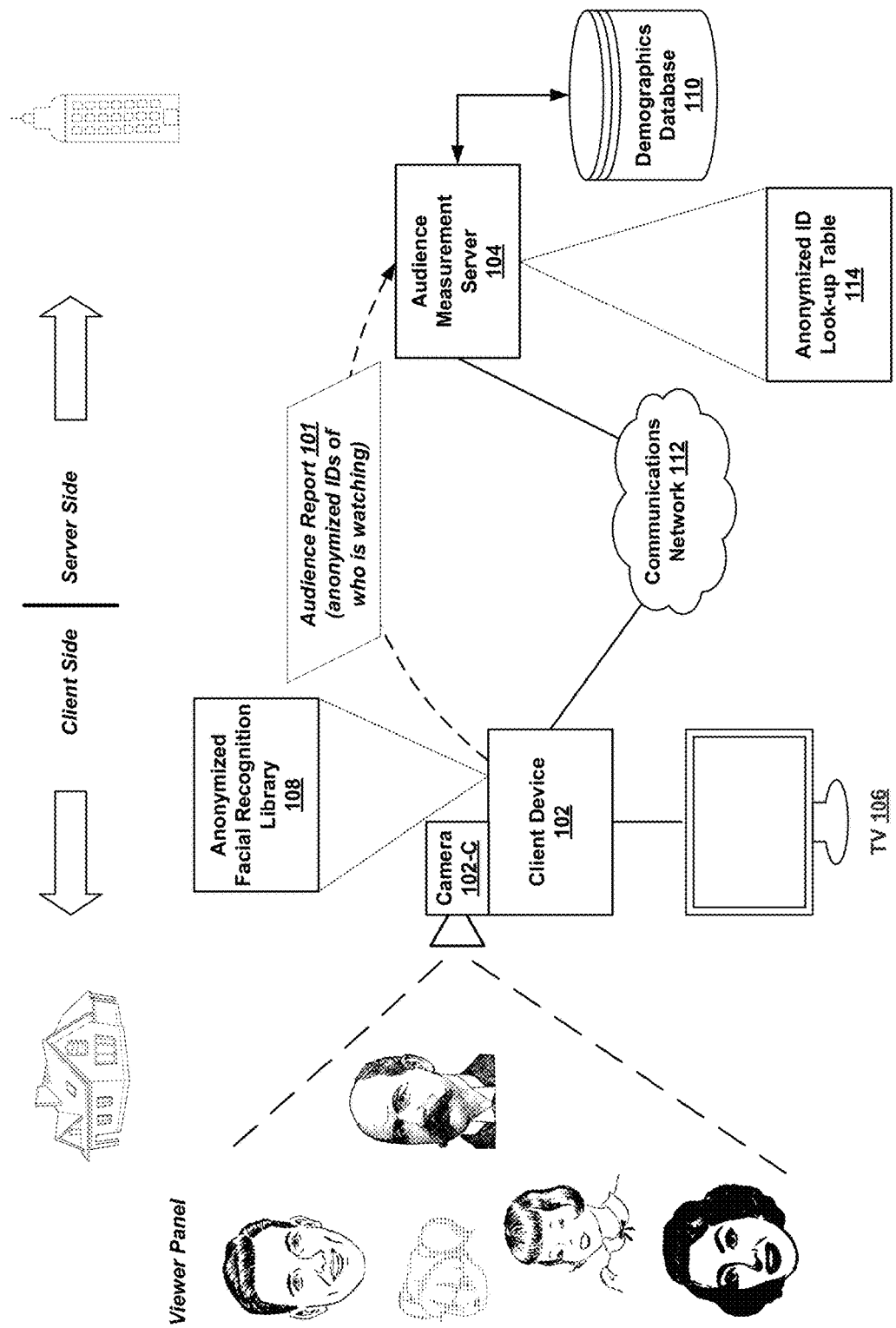
FIG. 1 is a simplified operational block diagram of an example audience measurement system in which various disclosed principles can be implemented.

Content providers may provide various forms of online streaming, broadcast, and/or downloadable media content to end users, including video media, music and other audio media, and other possible forms of media content, for example. A content provider may be a direct source of content for end users, or may provide content to one or more content distribution services, such as broadcasters, which then deliver selected content to end users. An example of a content provider could be a media content company that provides media content to media distribution services, which then deliver media content to end users. End users may subscribe at a cost to one or more media distribution services or directly to one or more media content companies for content delivery, and/or may receive at least some content at no charge, such as from over-the-air broadcasters or from public internet websites that host at least some free content for delivery to end users. Media content to end users may be delivered as broadcast or streaming content for immediate playout and/or may be downloaded media files that may be locally stored on user devices for playout at any time, for example.

Content providers and/or media distribution services may be interested in measuring viewing, listening, and/or other media-consumption statistics of end users who receive content. For example, content providers and/or media distribution services may want to correlate media TV programming preferences and/or habits of users (e.g., TV viewing choices) with their demographic information, such ages, gender identifications, professions, and educations. As another, non-limiting example, content providers and/or media distribution services may want to collect the same type of information about listeners of radio programs, or consumers of web-based content. Referred to herein as "audience measurement" information or data, such information or data may be useful for marketing, advertising, content-production planning, and/or program scheduling, among other possible uses.

In practice, audience measurement activities may be conducted by a third party, such as a market research company, and various results and measurements may be provided as a service to content providers, content distributors, content creators, and/or advertisers, for example. Accordingly, various audience measurement activities disclosed herein will be described as being carried out, by way of example, by a market research company or other entity acting in the service of, or on behalf of, content providers, content distributors, content creators, and/or advertisers. It should be understood however, that other, different third parties may undertake audience measurement activities. Further, it may be possible for any party interested in, and/or benefiting from, audience measurement activities and/or data, to directly carry out these activities for themselves. These considerations are not limiting with respect to example embodiments described herein.

Considering the example of TV programming and viewership, audience measurement may involve identifying potential TV viewers who agree to having their viewing habits, choices, and/or preferences monitored and recorded, and then collected as audience viewing statistics. A market research company (or other pertinent entity) may identify potential, willing viewers through a recruiting process, for example. Willing viewers may agree to provide various demographic information to the content provider and/or media distribution service, and also consent to the placement in their residence of a monitoring device that can determine their presence while watching TV programming. In particular, the monitoring device may record who among a household of willing viewers is present during each of some or all "viewing sessions" during which the TV is on (or active), as well as what TV programming (content) is being received by and/or presented on the TV during the viewing sessions. The monitoring device may further be configured to transmit audience viewing statistics in the form of audience viewing reports, for example, the market research company, and/or possibly to the content provider and/or media distribution service. Transmissions may be made via one or another form of communicative connection, such as an internet or other network communication connection, for example.

In accordance with example embodiments, the monitoring device may include a camera, such as a digital or video camera, and one or more processors configured for carrying out various monitoring, analyzing, recording, and/or transmitting operations, as described in detail below. More specifically, the monitoring device may capture images of viewers who are present when the TV is switched on and while it remains on, and use a machine learning (ML) based computational model to recognize those present from among a "facial recognition library" established for the willing viewers of the household. For a given household, residence, or other domicile, a group of willing viewers may be referred to as a "panel" of viewers, a term that is also used herein. Thus, for a given viewing session, the monitoring device may identify which panel members are present, and transmit that information back to an audience measurement server owned and/or operated by or on behalf of the market research company, and/or possibly the content provider and/or media distribution service. The audience information may then be analyzed for various marketing, advertising, content production, and/or scheduling purposes, among other possible uses.

A facial recognition library may include a list or table of panel members, each with an associated identifying photograph or other image representation that can be compared in some manner with images of viewers present during viewing sessions. Conventional techniques for library construction may involve a manual process by which a representative of the content provider and/or media distribution service may personally meet panel members, take their photographs, and record the library entries. However, given a typically large number of panels and viewers that may be recruited, such conventional techniques are inefficient and do not scale in any practical sense.

The inventor has recognized that ML-based techniques may be used to automate construction of facial recognition libraries. In particular, a monitoring device may be configured to capture multiple images of panel members, and associate the images with an anonymized identity scheme that enables communication with a remote audience measurement server in a manner that protects the privacy and/or anonymity of each individual panel member. The inventor has further developed techniques for accommodating most or all of a variety of physical and environmental conditions under which panel-member images may be captured over the course of multiple viewing sessions. Physical and environmental conditions may include both external factors, such as lighting and distance between a camera of a monitoring device and panel members, as well as behavior factors, such as physical poses and/or postures of panel members during viewing sessions. Example embodiments of systems and methods for automated construction and use of anonymized facial recognition libraries are described by way of example in the present disclosure.

While the techniques disclosed herein are described by way of example in terms of audience measurement of TV and/or video viewing, the techniques may be extended to audience measurement of other forms of end-user consumption of media content. Other non-limiting examples may include audience measurement of listening habits and choices of listeners of audio content, such as radio broadcasts, as well as audience measurement of end-user consumption of web-based content.

II. Architecture

A. Example System for Automated Video Segmentation

FIG. 1 is a simplified operational block diagram of an example audience measurement system 100 configured for automated construction of an anonymized facial recognition library. As shown, the example audience measurement system 100 includes a client device 102 with a camera 102-C deployed at client-side site, such as an a residence or domicile of a viewer panel, and an audience measurement server 104 and demographics database 110 deployed at server-side site, such a managed network and/or cloud computing platform owned and/or operated by or on behalf of the content provider and/or media distribution service. The client device 102 and camera 102-C may be considered the monitoring device discussed above, for example. The client device 102 may include, for example in memory, an anonymized facial recognition library 108 that associates users with various versions of their images in a manner that both protects users' privacy and maintains their anonymity. As shown, the client device may be communicatively connected to a TV 106, and may also have a communicative connection with the audience server 104 by way of a communications network 112, such as an internet, for example. In some deployments, another type content presentation device, besides or in addition to, a TV 106 could be used. For example, a PC, desktop computer, or tablet, among other non-limiting examples.

Also as shown, the audience measurement server may be communicatively connected with the demographics database 110, and may further have access to and/or store an anonymized ID look-up table 114 that enables correlation of a form of anonymous image IDs with proxy (or alias) identifiers of users. As described below, the client device 102 and camera 102-C may operate to automatically construct both the anonymized facial recognition library 108 and the anonymized ID look-up table 114, and transmit the anonymized ID look-up table 114 to the audience measurement server 104. In some embodiments or variations within embodiments, as described below, audience measurement operations may be carried out without necessarily having a copy of the anonymized ID look-up table 114 at the server side (e.g., in the audience measurement server). Instead (or in addition), information about panel members present during one or more viewing sessions may be provided in the form of "name IDs" that serve as proxies or aliases for actual names.

During audience measurement operations, the client device 102 may be configured to detect when the TV 106 is turned on or made active, and is, or starts, receiving TV programming via one or another form of broadcast stream. Non-limiting examples a broadcast stream may include over-the-air broadcasts, cable TV broadcasts, and/or network streaming. TV programming may include scheduled broadcasts and/or on-demand streaming, and content may include TV shows (e.g., TV productions, sporting events, etc.) and movies, for example. The client device 102 may also be configured to identify the specific TV programming that is being received and presented at any given time when the TV is on or active. The time during which the TV 106 is on or active and receiving and presenting media content is referred to herein as a "viewing session." There may be one or more viewing sessions over the course of any given time interval, and the client device 102 may thus detect and/or become active during any or all of the one or more viewing sessions.

For purposes of discussion, a hypothetical viewer panel of five members is represented by drawings of faces on the left of FIG. 1. By way of example, the panel members are taken to be a hypothetical family of a mother, a father, two girl children, and a grandfather. The specific characterizations of the hypothetical viewer panel members serve to illustrate various aspects of example demographic information, as well as various aspects of example operation. Otherwise, the particular combination panel members is arbitrary, as are the illustrated faces of the panel members. In accordance with example embodiments, it is assumed that the panel members have consented to their membership on the panel, including consent to having their images captured during viewing sessions, and their viewing habits and choices reported in anonymous fashion to the audience measurement server 104.

In accordance with example embodiments, when the client device 102 detects or otherwise becomes aware of the start of a viewing session, the client device may activate the camera 102-C in order to monitor who is present during the viewing session. More specifically, the camera 102-C may operate to capture images of those present during the viewing session. With the assumption that the client device 102 has been deployed in the residence or domicile of a consenting panel of viewers, monitoring may be configured to determine which panel members are present during any given viewing session. In particular, the client device 102 and camera 102-C may be configured to capture facial images of viewers present during a viewing session, and to determine their identities from among the known panel members.

As used herein, the term "facial image" may be used to refer to an image of one face in a region of an image containing that one face. In some instances, an image may contain more than one face, each in a different region of the image. In other instances, an image may contain just one face in one region that may correspond to all or most of the image, or just a portion of the image. The described use of the term "facial image" applies to either or both instances.

In further accordance with example embodiments, the identities of the panel members present during a given viewing session may be determined by comparing captured facial images with one or more "representative" facial images of the panel members previously stored at the client device 102. An example identification process is described below. At one or more times after the identities of the panel members present at a given viewing session have been determined, the client device 102 may generate an audience report 101 and transmit the report to the audience server via the communications network 112 or other communicative connection. The audience report 101 may include anonymized panel-member identity information, as well as an indication of the TV programming being received during the session. As described below, anonymized identity information may include proxy identities of the panel members, and/or anonymous identities of the one or more representative images determined to match those of the facial images captured during the session.

In some operational scenarios, the client device 102 may aggregate multiple audience report from multiple viewing sessions, and send the aggregate to the audience measurement server in one transmission or message. The aggregate report of multiple viewing sessions could also be considered a single audience report containing the viewing results multiple viewing sessions.

In accordance with example embodiments, the representative images of the panel members may include one or more different images of each of the panel members. Different representative images of any given panel member may correspond to a representative image of the given panel member captured under different environmental or physical conditions during different viewing sessions (or even the same viewing session), such as different lighting, different distances from the camera, and different physical poses or postures of the given panel member, among other possible conditions. Thus, the representative images of each panel member may be captured and stored for facial recognition operations during subsequent viewing sessions. Having different representative images of each panel member stored in this way may help ensure that during any given viewing session, each panel member present may be recognized as matching at least one of their previously established representative images. As described below, actual images may be mapped to representational forms that replace the actual images, thereby removing the need to store actual images. In turn, this further enhances user privacy.

In further accordance with example embodiments, each representative image may be assigned a unique "image ID" that serves to anonymously identify the panel member associated with the representative image. Because each panel member may be associated with more than one representative image, each name ID may be associated with more than one image ID. However, each image ID may be associated with only one name ID. In some example embodiments, the anonymized facial recognition library 108 may be or include a table or list of the associations of image IDs with mapped representational forms of the images. Further, the anonymized ID look-up table 114 may be or include a table or list of associations of user proxy (or alias) IDs with the image IDs of the anonymized facial recognition library 108. By providing the audience measurement server with the anonymized ID look-up table 114, audience reports 101 for subsequent viewing sessions may anonymously identify the panel members present at the subsequent viewing sessions by providing only the image IDs and/or the name IDs to the audience measurement server 104. Either way, the audience measurement server 104 may determine the name IDs of the panel members present. For example, if the image IDs are provided, the anonymized ID look-up table 114 may be consulted in a look-up to determine the name IDs; if the name IDs are directly provided, then no look-up is necessary. This is discussed in more detail below.

As also described below, the demographics database 110 may include the name IDs associated with each panel member's demographic information. Thus, with the name IDs for any given session, the audience measurement server 104 may determine and/or analyze demographic information about viewership of the programming received by the panel during the given session. This type of analysis may then be performed for any viewing sessions for which audience reports are received.

While the anonymized facial recognition library 108 can be generally considered as associating users with various versions of their images, mapping of images to representational data forms can eliminate the need to maintain actual images, other than for initial analyses. More specifically, example embodiments may in addition or instead map images to feature vectors, and perform image comparisons in feature vector space. More specifically, each representative image may be processed by an ML-based feature-extraction model and mapped to a respective feature vector, such as an embedding feature vector. In feature vector space, feature vectors derived or extracted from similar images will tend to cluster together, while those derived or extracted from dissimilar images will tend to be more widely separated.

Feature vectors also typically have many fewer dimensions that the images from which they are derived or extracted. For example, a digital image of 106 pixels—e.g., an array of 1,000×1,000 pixels—may be resized to 64×64 pixels, 128×128 pixels, or 256×256 pixels, and then mapped to a feature vector of roughly 200 dimensions. Feature vectors may also enable relatively simple computations. For example, a quantitative comparison of two feature vectors may be computed as a cosine or inner (or dot) product of the two vectors. Other measures of the closeness or similarity of feature vectors are possible as well.

In accordance with example embodiments, feature vectors of representative images of panel members may be evaluated for clustering in feature vector space, and identified clusters may then be used to identify the panel members. To the extent that the representative images of a given panel member correspond to images captured under different conditions (e.g., lighting, distance, poses, postures, etc., as described above), the feature vectors derived or extracted from the representative images of the given panel member may form different clusters in feature vector space. Thus, a given panel member may be associated with more than one feature vector cluster, each cluster corresponding to similar representative images of the given panel member, such as representative images captured under similar conditions. However, each feature vector cluster may be expected to be associated with only on panel member.

In further accordance with example embodiments, a location in feature vector space of each cluster may be specified according to a centroid computed from the feature vectors that form the cluster. The centroid of each cluster is itself a feature vector, and may be used to designate the cluster location. The anonymized facial recognition library 108 may be constructed as a table centroid feature vectors, each assigned a unique "cluster ID" (unique within the context of any given panel). The anonymized ID look-up table 114 may be constructed as a table of name IDs each associated with one or more cluster IDs. As described below panel members may be recognized during viewing sessions by comparing feature vectors of their captured images to centroid feature vectors. The anonymized facial recognition library 108 may then be used to anonymously identify recognized panel members simply according to cluster IDs. The anonymized ID look-up table 114 may then be used to associate the cluster IDs with name IDs.

More specifically, feature vectors may also be used to identify which panel members are present during any given viewing session. In accordance with example embodiments, facial images of panel members captured during a given viewing session, referred to herein as "session images," may be processed by the ML-based feature-extraction model to extract "session feature vectors" for each panel member present during the session. The session feature vectors may then be compared with the centroid feature vectors of the previously-established clusters. For well-separated clusters, each given session feature vector may then be expected to be a statistically close match with just one cluster, and that cluster's cluster ID may be used to identify the panel member whose session image corresponds to the given session feature vector.

Using feature vectors of session images, the audience report 101 may include cluster IDs instead of or in addition to name IDs. The audience measurement server 104 may then determine the name IDs of the panel members present either by having received the name IDs directly in the audience report 101, or by using received cluster IDs to look up the corresponding name IDs in the anonymized ID look-up table 114.

When a panel of viewers is first established, for example through a recruiting campaign or process, their demographic information may be collected consistent with the panel members' agreement to have their viewing habits, choices, and/or preferences monitored and anonymously reported to the market research company (or to other pertinent entity and/or possibly the content provider and/or media distribution service). Initially, there may be no anonymized facial recognition library 108, nor any representative images or centroid feature vectors against which to compare session images captured during viewing sessions. In accordance with example embodiments, a set of representative images of all the panel members may be obtained automatically during one or more viewing sessions over a period of time designated for that purpose, as well as for building or creating both the anonymized facial recognition library 108 and the anonymized ID look-up table 114.

More particularly, part of the viewers' agreement may include consent to placement of the client device 102 and camera 102-C in the panel members' residence or domicile. Facial images of those panel members present during each of one or more initial viewing sessions may then be captured by the camera 102-C. The ML-based feature-extraction model may be applied to each facial image, and the extracted feature vectors may then be analyzed in the feature vector space in order to identify clusters as they emerge with more and more samples of feature vectors.

Initially, when there may be a relatively small number of captured facial images, clusters of feature vectors may not be apparent. Additionally, even as clusters become apparent as more and more facial images are acquired during successive viewing sessions, it may still be the case that a still-accumulating corpus of facial images does not account for all of the different conditions under which images of the panel members will ultimately be captured. For example, after a few initial sessions, there could be images of each panel member captured during only one particular time of day, such that each panel member's image has be captured under only one lighting condition. In this case, there might be one cluster for each panel member representing just one image-capture condition.

As more and more initial viewing sessions occur, however, more and more image-capture conditions may be sampled, and more and more feature vector clusters may be formed and identified from the captured facial images. Eventually, when all of the image-capture conditions for the panel members at their residence have been sufficiently sampled, additional images may refine the spatial definitions of the identified clusters, but no additional cluster may emerge or become apparent from the additional feature vectors. At this point, the feature vector clusters may be considered to correspond to all of the likely possible representative images of the panel members. Once the clusters have stabilized in this manner, the clusters may be used to create or construct the anonymized facial recognition library 108 and the anonymized ID look-up table 114.

In accordance with example embodiments, the centroid feature vector of each stable cluster may be assigned a unique cluster ID, and used as a representative feature vector anonymously associated with the identity of one of the panel members. As described above, each panel member may be associated with more than one cluster via the cluster's centroid feature vector, but each cluster (or each cluster's centroid feature vector) may be associated with only one panel member. Note, however, that a cluster ID by itself does not identify a specific panel member. Identification of the panel member associated with a given cluster and its cluster ID may be achieved by applying an ML-based facial recognition model to a representative image having a feature vector close to the centroid feature vector, or at least within the given cluster.

In accordance with example embodiments, the ML-based facial recognition model may initially be trained to predict certain demographic characteristics, given an input image. Non-limiting examples of such demographic characteristics include age, identified gender, and height. These demographic characteristics may be included in the demographic information collected from each panel member as part of their agreement to act as willing viewers on the panel. Thus, applying the trained ML-based facial recognition model to the representative image the given cluster may yield predictions of demographic characteristics that can then be matched against the known demographic information. In this way, the identity of the panel member associated with each cluster ID may be automatically determined and recorded in the anonymized ID look-up table 114. With the association of cluster IDs with centroid feature vectors, the anonymized facial recognition library 108 may be constructed. And with the association of the name IDs with cluster IDs, the anonymized ID look-up table 114 may be constructed. With the combined information of the anonymized facial recognition library 108 and the anonymized ID look-up table 114, the audience measurement operations, such as those described by way of example above, may be carried out.

In further accordance with example embodiments, when the ML-bases facial recognition model fails to predict an association between a representative image and any one panel member's identity to a sufficient statistical confidence level, the identification process may be augmented by querying one or more of the panel members for the identity. For example, the client device 102 may provide a representative image to a designated panel member, together with a query for an identity to associate with the image. The query could be presented, and the response provided, directly on a user interface of the client device. Additionally or alternatively, the query and response could be performed via a network communication channel, such as email or a web-based application.

While the initial input of demographic information may include each panel member's actual identity (e.g., name), once the initial input is complete, only their name ID's may need be retained, thus establishing their anonymity in the creation of the anonymized facial recognition library 108 and the anonymized ID look-up table 114, as well in subsequent audience measurement operations. As an additional degree of anonymity and privacy, once the feature vector clusters are established and identified, the actual images used in generating the clusters need not be retained. All future identifications may be made in feature vector space.

In this disclosure, the term "anonymized facial recognition library" is sometimes used in a general way to identify combined features and functionality of elements more specifically identified as the anonymized facial recognition library 108 and the anonymized ID look-up table 114. As such, when specifically identified or described as elements, the anonymized facial recognition library 108 and the anonymized ID look-up table 114 may be considered components of the more generally defined facility. In any particular discussion herein, which of the more general or specific meanings are intended should either be clear from context, or will be made explicit in the particular discussion.

Further details of an example automated construction and use of an anonymized facial recognition library are described below. An audience measurement system 100 configured for automated construction of an anonymized facial recognition library and/or components thereof can take the form of, be part of, or include or encompass, one or more computing systems or computing devices, as well as program or software instructions for carrying out various operations described herein. Before describing example operation of an audience measurement system 100, an example of a computing system or device is first described.

B. Example Computing System

Figure 2:
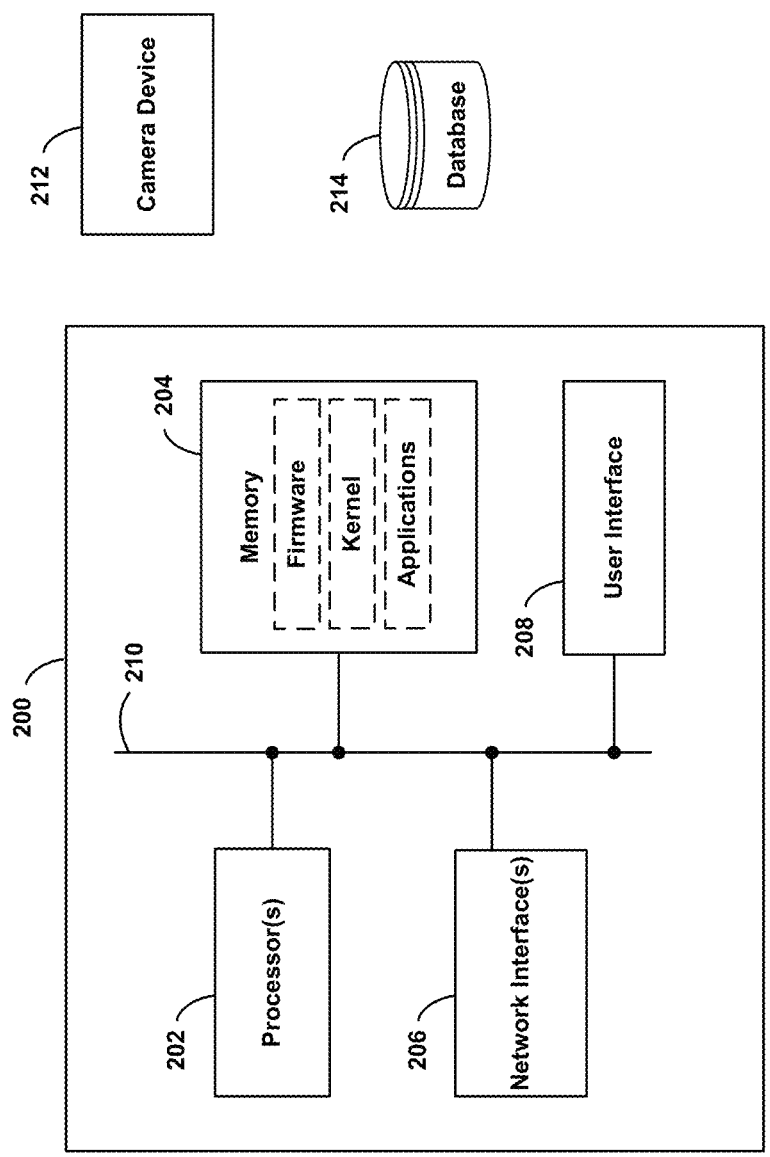
FIG. 2 is a simplified block diagram of an example computing system in which various disclosed principles can be implemented.

FIG. 2 is a simplified block diagram of an example computing system (or computing device) 200. The computing system 200 can be configured to perform and/or can perform one or more acts, such as the acts described in this disclosure. As shown, the computing device 200 may include processor(s) 202, memory 204, network interface(s) 206, and an input/output unit 208. By way of example, the components are communicatively connected by a bus 210. The bus could also provide power from a power supply (not shown).

Processors 202 may include one or more general purpose processors and/or one or more special purpose processors (e.g., digital signal processors (DSPs) or graphics processing units (GPUs). Processors 202 may be configured to execute computer-readable instructions that are contained in memory 204 and/or other instructions as described herein.

Memory 204 may include firmware, a kernel, and applications, among other forms and functions of memory. As described, the memory 204 may store machine-language instructions, such as programming code or non-transitory computer-readable storage media, which may be executed by the processor 202 in order to carry out operations that implement the methods, scenarios, and techniques as described herein. In some examples, memory 204 may be implemented using a single physical device (e.g., one magnetic or disc storage unit), while in other examples, memory 204 may be implemented using two or more physical devices. In some examples, memory 204 may include storage for one or more machine learning systems and/or one or more machine learning models as described herein.

In some instances, the computing system 200 can execute program instructions in response to receiving an input, such as an input received via the communication interface 206 and/or the user interface 208. The data storage unit 204 can also store other data, such as any of the data described in this disclosure.

The communication interface 206 can allow the computing system 200 to connect with and/or communicate with another entity according to one or more protocols. In one example, the communication interface 206 can be a wired interface, such as an Ethernet interface. In another example, the communication interface 206 can be a wireless interface, such as a cellular or WI-FI interface.

The user interface 208 can allow for interaction between the computing system 200 and a user of the computing system 200, if applicable. As such, the user interface 208 can include, or provide an interface connection to, input components such as a keyboard, a mouse, a touch-sensitive panel, and/or a microphone, and/or output components such as a display device (which, for example, can be combined with a touch-sensitive panel), and/or a sound speaker.

The computing system 200 can also include one or more connection mechanisms that connect various components within the computing system 200. For example, the computing system 200 can include a connection mechanism 210 that connects components of the computing system 200, as shown in FIG. 2.

Network interface(s) 206 may provide network connectivity to the computing system 200, such as to the internet or other public and/or private networks. Networks may be used to connect the computing system 200 with one or more other computing devices, such as servers or other computing systems. In an example embodiment, multiple computing systems could be communicatively connected, and example methods could be implemented in a distributed fashion.

Although not explicitly shown, the computing system 200 may also include one or more device controllers and/or interfaces for connecting to integrated and/or peripheral devices. In an example embodiment such as the monitoring device described above, a camera device 212 be included as a peripheral device and/or as an integrated device.

In example embodiments the computing system 200 may be or include a client device, such as client device 102 discussed above. Such a client device may include an interactive display, such as a GUI. In addition to the operations discussed above and detailed below, a client device may generally be used for user access to programs, applications, and data of the computing device 200. For example, a GUI could be used for graphical interaction with programs and applications described herein.

Database 214 may include storage for input and/or output data, such as demographic information. Thus, demographics database 110 may be an example of the database 214.

In some configurations, the computing system 200 can include one or more of the above-described components and can be arranged in various ways. For example, the computer system 200 can be configured as a server, such the audience measurement server 104, and/or a client (or perhaps a cluster of servers and/or a cluster of clients) operating in one or more server-client type arrangements, for instance.

III. Example Operations

A. Example Data Structures

FIG. 3 illustrates example panel demographic information 300, an example anonymized facial recognition library 108, an example anonymized ID look-up table 114, and an example audience report 101, in accordance with example embodiments. The example panel demographic information 300 is taken to be that of the hypothetical panel members of FIG. 1, and the five members of the panel—grandfather, father, mother, and two girls—are listed in that order with arbitrary names Fred, Tom, Sally, Kim, and Molly. While their actual names may be collected at some point during a recruiting or other sign-up process, the actual names may subsequently be omitted after being replaced by name IDs. As such, the demographic information, as well as operations in connection with constructing the anonymized facial recognition library 108 and the anonymized ID look-up table 114, and creating audience measure reports, may avoid actual names of panel members. The listing of the names is shown outside of the thick black line on the left side of the example panel demographic information 300 to signify their omission from the demographic information as stored in the demographics database 110, for example.

The example panel demographic information 300 is depicted in the form of a table including a common header and seven columns. Each line of the table corresponds to one of the panel members. The common header includes a panel ID, set to a hypothetical value of "G-8374," and the panel's geographic regions, set hypothetically to "Mid-Atlantic." The first column of the table lists the name IDs of the panel members. The subsequent columns list the ages, height, gender ID, education, occupation, and salary of the panel members. As illustrated by way of example, and with arbitrary settings or values, the name IDs of Fred, Tom, Sally, Kim, and Molly, are G1, G2, G3, G4, and G5, respectively. Also shown in name order and with arbitrary, illustrative settings or values, are the ages, height, gender ID, education, occupation, and salary.

The particular types of demographic information shown are illustrative, and not intended to be limiting with respect to example embodiments. The selection or choices of types or categories of demographic information may be determined by, or no behalf of, the market research company (or other pertinent entity and/or content provider and/or media distribution service), for example, and may reflect particular kinds of analyses desired. Non-limiting examples may include marketing studies, advertising campaign planning and/or assessment, and program schedule planning. Identifying panel members by their name IDs allows collection of audience data and the analyses carried out with the data to be done without reference to any actual name of the panel members.

The example panel demographic information 300 may be collected separately for multiple panels and stored in the demographics database 110, for example. In practice, there may be many thousands of panels, each with their respective demographic information stored in this way.

The example anonymized facial recognition library 108 shown in FIG. 3 is depicted as a table with a common header and two columns. The common header includes the panel ID, which enables the library for any given panel to be associated with the panel's demographic information. In the example of FIG. 3, the panel ID of the example anonymized facial recognition library 108, G-8374, matches that of the example panel demographic information 300. The two columns then list the unique cluster IDs of clusters and the cluster centroid feature vectors. In the illustrative example, the anonymized facial recognition library 108 has 11 feature vector centroids, FVC_1 $\{x_1, x_2, \ldots, x_n\}$; FVC_2$\{x_1, x_2, \ldots, x_n\}$; ...; FVC_2$\{x_1, x_2, \ldots, x_n\}$, each having components $x_1, x_2, \ldots, x_n$ in an n-dimensional vector space by way of example. The determination of the cluster centroid feature vectors is described by way of example below.

The example anonymized ID look-up table 114 shown in FIG. 3 is depicted as a table with a common header and two columns. The common header includes the panel ID, which enables the ID look-up table for any given panel to be associated with the panel's demographic information. As with the anonymized facial recognition library 108, the panel ID of the example anonymized ID look-up table 114 is G-8374, matching that of the example panel demographic information 300. The two columns then list the name IDs of the panel members and the cluster IDs associated with each panel member. The establishment of this association is described in detail below. By way of example, name IDs, G1, G2, G3, G4, and G5, are associated with cluster IDs in the illustration are (1, 2), (3, 4, 7), (5, 6), (8, 11), and (9, 10), respectively. The parenthetical groupings of cluster IDs designate multiple cluster IDs for the associated name IDs.

The example audience report 101 includes a first header designating the panel ID, a sub-header containing session programming information, and a listing of panel members detected during the session. The panel ID enables the audience report 101 to be associated with both the example anonymized ID look-up table 114 and the panel's demographic information. The session programming information may be used to identify what programming and/or content was being received and/or displayed by the TV or other content presentation device during the session associated with the report. The panel members present during the viewing session may be identified by their associated photo-cluster IDs and/or their name IDs. By way of example, the panel members' name IDs are outlined in a dashed rectangle to indicate that name IDs might, in some embodiments or deployments, be optional. The panel members' cluster IDs are outlined in a solid rectangle to indicate that cluster IDs might be a primary or mandatory identifier in audience reports. It should be understood that either type of identifier may be used as long as it maintains anonymity and/or privacy of the panel members. Other types of identifiers that achieve anonymity and/or privacy may also be used.

As summarized above, demographic information might be collected as an initial operation, during panel recruitment, for example. Audience reports may be generated during or after viewing sessions. In accordance with example embodiments, the anonymized facial recognition library 108 and the anonymized ID look-up table 114 may be constructed during a set of initial viewing sessions. Operations involving construction and usage of the anonymized facial recognition library 108 and the anonymized ID look-up table 114 are described next.

B. Library Construction and Usage Operations

FIG. 4 is a conceptual illustration of facial images acquired under different settings and/or different environmental conditions, in accordance with example embodiments. The illustration uses the example images of the hypothetical panel shown in FIG. 1, and associates the example names introduced in connection with the example panel demographic information 300 with the example facial images. Specifically, the five facial images are arranged in a column at the left side of FIG. 4, and designated from top to bottom with the names Fred, Tom, Sally, Kim, and Molly.

Each given facial image at the left is then followed from left to right by a row of six versions of the given facial image. Each version is meant to represent an image of the leftmost panel member captured under different conditions. As conceptual rather than actual illustrations of the different capture conditions, the different image versions are depicted with visual cues representative of the different conditions. Thus, by way of example, in the first four versions in each row (from left to right), different lighting conditions are depicted as shaded gray ovals covering different portions of each facial image with differing degrees of opacity. The last two images on the right in each row are depicted in different sizes, representing different distances between a camera of a monitoring device and the panel member. The visual cues should not be interpreted as realistic representations of the effects of different capture conditions on the example images, but rather as convenient visual distinctions for the purposes of illustration.

It should be understood that the six example versions are not intended to represent all possible variations of capture conditions of images, but rather serve as conceptual illustrations for purposes of present discussion. In actual practice, there could be more or fewer image versions of any one panel member, corresponding to more, fewer, and/or different capture conditions than the ones depicted by way of example in FIG. 4. For example, any panel member might assume different physical postures during different viewing sessions of even during the course of a given viewing session.

Figure 5:
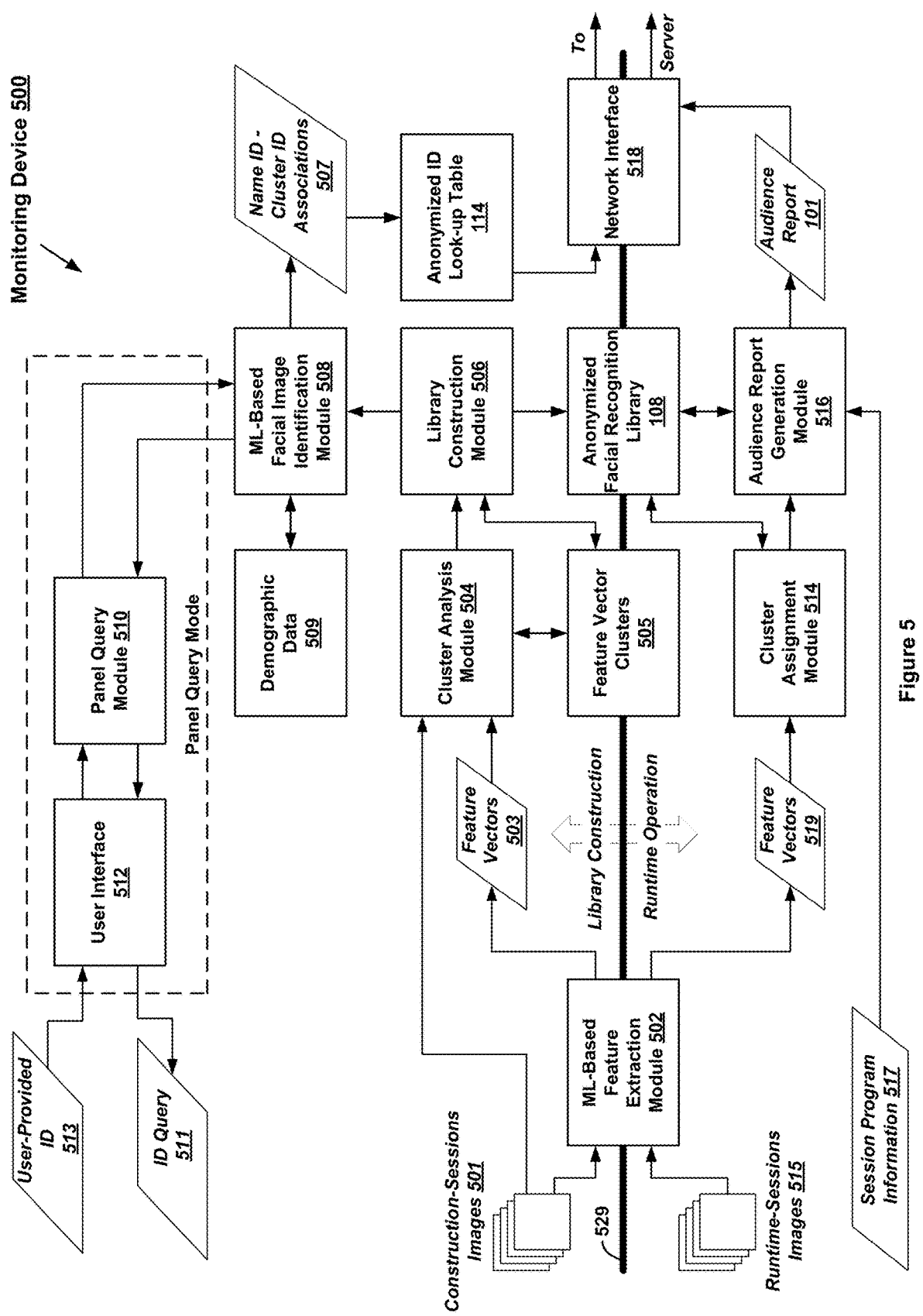
FIG. 5 is an illustrative operational block diagram of an example monitoring device, in accordance with example embodiments.

FIG. 5 is next an illustrative operational block diagram of an example monitoring device 500, in accordance with example embodiments. In particular, FIG. 5 illustrates example operations involved in construction of an anonymized facial recognition library, as well as subsequent usage of the constructed library in audience measurement operations. For purposes of discussion, a thick black horizontal line 529 separates the library construction operations, shown above the line, from the audience measurement operations, shown below the line. The audience measurement operations are designated as "runtime operation" in FIG. 5. Components of the monitoring device 500 shown on the line 529 support operations that may be common to both library construction and audience measurement.

By way of example, the monitoring device 500 could be, or include, the client device 102 and camera device 102-C shown in FIG. 1. In the example operations described in connection with FIG. 5, however, a camera or camera device or component is not depicted explicitly. It may be assumed that images shown as being received by the monitoring device 500 may be captured and provided by such a camera, camera device, or camera component.

In accordance with example embodiments, the monitoring device 500 can include various components, any one or more of which may be implemented as or in one or more processors of the monitoring device. As such, components of the monitoring device 500 may themselves be or include hardware, software, firmware, or combinations thereof. Some of the components of the monitoring device 500 may be identified structurally, such as databases or other forms of data storage and management, and others may be identified in terms of their operation or function. Operational and/or functional components could be implemented as software and/or hardware modules, for example, and will sometimes be referred to herein as "modules" for the purpose of the present discussion.

The monitoring device 500 can also include one or more connection mechanisms that connect various components within the monitoring device 500. By way of example, the connection mechanisms are depicted as arrows between components. The direction of an arrow may indicate a direction of information flow, though this interpretation should not be viewed as limiting. In this disclosure, the term "connection mechanism" means a mechanism that connects and facilitates communication between two or more components, devices, systems, or other entities. A connection mechanism can include a relatively simple mechanism, such as a cable or system bus, and/or a relatively complex mechanism, such as a packet-based communication network (e.g., the Internet). In some instances, a connection mechanism can include a non-tangible medium, such as in the case where the connection is at least partially wireless. A connection mechanism may also include programmed communication between software and/or hardware modules or applications, such as application program interfaces (APIs), for example. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

Construction of an anonymized facial recognition library 108 and the anonymized ID look-up table 114 is first described.

During library construction operations, construction-session images 501 of panel members are received at a ML-based feature extraction module 502 from a camera that may part of, or connected to, the monitoring device 500. The construction-session images 501 may be, or have been, captured during one or more viewing sessions, each of which may be attended by one or more of the panel members in various combinations. The ML-based feature extraction module 502 may implement an ML-based extraction model previously trained for predicting feature vectors from input images. As such, the output of the ML-based feature extraction module 502 may be feature vectors 503, as shown. In accordance with example embodiments, the ML-based extraction model may be, or be implemented with, an artificial neural network, for example. However, other computational techniques may be used as well.

In practice, a camera of, or connected to, the monitoring device 500 may capture images that encompass a field of view (FOV) that may possibly include more than one panel member present during any given viewing session. For example, the camera may be configured with a FOV that includes all or part of a room in which the TV and monitoring device are placed, and in which viewing sessions take place. As such, images captured by the camera may include all of those panel members present during image capture. In accordance with example embodiments, the ML-based feature extraction module 502 may additionally be configured or trained to recognize the presence and locations of faces in any given image, and to perform feature extraction separately within each region identified as containing a facial image. In this way, the feature vectors 503 may correspond to individual facial images in input construction-session images 501. Thus, the ML-based feature extraction module 502 may generate more than one feature vector from a given input image.

Also in accordance with example embodiments, the feature vectors 503 may be embeddings, which map the images to a reduced-dimensioned representational space. As noted above, for example, a digital image of 106 pixels—e.g., an array of 1,000×1,000 pixels—may be resized to 64×64 pixels, 128×128 pixels, or 256×256 pixels, and then mapped to a feature vector of roughly 200 dimensions. This scale reduction is just one example; others are possible as well. In some examples, the resized dimensions could correspond to one or more portions of a larger image containing individual faces.

The feature vectors 503 may next be input to a cluster analysis module 504 that may evaluate a proximity of all pairs of feature vectors in feature vector space. The proximity of any two feature vectors may be computed as an inner vector product, or cosine product, for example. When normalized, the cosine product may take on a value between zero and one, with the value being closer and closer to one for feature vectors that are closer and closer to each other in feature vector space. Conversely, feature vectors that are dissimilar will be more distant from each other in feature vector space, and their cosine product will approach zero. This pair-wise analysis may thus result in clusters of feature vectors 503 that are similar, while an inter-cluster distance measures the separation of clusters in feature vector space.

Analytically, clusters may be defined as groupings of feature vectors that are all within a cluster threshold distance from a centroid of the group or specified subgroup. Conversely, clusters may be distinguished from one another analytically according to inter-cluster distances greater than a separation threshold. To the extent that feature vectors in a given cluster are similar to each other to within some threshold (e.g., related to the cluster threshold distance), the feature vectors of the given cluster be associated with facial images that are also similar to some degree to each other. Thus, feature vector clusters may correspond to groups of similar facial images, and may be used to identify individual panel members, as well as similar image-capture conditions of the facial images respectively associated with the clusters.

During initial viewing sessions of library construction operations, the panel members present, as well as the variety of image-capture conditions, may represent a relatively sparse sampling of possibilities of both circumstances. Correspondingly, a relatively few clusters, if any, may be identified in the initial results of the cluster analysis module 504. However, as more and more viewing sessions occur or take place, the sampling of circumstances-both the panel members present and the image-capture conditions—may be expected to increase such that the feature vectors 503 form identifiable cluster in feature vector space. It may further be expected that as even more viewing sessions occur or take place, no further clusters emerge or are identified. At this point, the set of clusters so obtained may be considered to be "stable," corresponding to collection of a complete set of representative facial images of all panel members captured under a likely complete sampling of image-capture conditions.

Once the stable set of feature vector clusters has been obtained, as determined in this manner, the cluster analysis module 504 may store and/or record the stable set of clusters, designated feature vectors 505 in FIG. 5. In accordance with example embodiments, the cluster analysis module 504 may compute a centroid feature vector for each cluster from the feature vectors in each cluster. In addition, a cluster ID may be assigned to each cluster. The feature vector clusters 505 may thus store or record each cluster together with a respective centroid feature vector and a respective cluster ID. In some embodiments, only the centroid feature vector and its associated cluster ID may be stored for each cluster. Additionally or alternatively, some or all of the feature vectors belonging to each cluster may be stored or recorded as well. In either case, the cluster ID of a given cluster may be associated with a particular representative feature vector of the given cluster. The representative feature vector may be the centroid feature vector, or another one of feature vectors of the given cluster selected according to some specified criteria, for example.

In addition to determining and storing a centroid (or other representative) feature vector of each identified cluster, the cluster analysis module 504 may also identify a representative image associated with each cluster. In an example embodiment, the cluster analysis module 504 may receive some or all of the construction-session images 501, as indicated in FIG. 5, and associate them with the feature vectors 503. Once the clusters are established and the centroid feature vector of each cluster computed, the cluster analysis module 504 may determine an "operative" feature vector for each cluster as being one that, among the cluster members, is closest to the centroid, or within some threshold distance from the centroid, for example. For each cluster, the image associated with the operative feature vector may then be identified as the representative image for the cluster. Other ways of determining the representative image for a cluster may also be possible.

In accordance with example embodiments, after storing the feature vector clusters 505, including representative images, the cluster analysis module 504 may then invoke the library construction module 506 to construct the anonymized facial recognition library 108 and the anonymized ID look-up table 114. More particularly, the library construction module 506 may access the feature vectors 505 and retrieve the centroid feature vector for each cluster, together with the associated cluster ID of the representative feature vector. In some embodiments, a representative feature vector other than the centroid feature vector, such as the operative feature vector, could be used.

The anonymized facial recognition library 108 may then be constructed as a table of entries, where each entry is a different one of the centroid feature vectors and its cluster ID. To the extent that the feature vector clusters 505 contain the centroid feature vectors and their assigned cluster IDs, the feature vector clusters 505 may and the anonymized facial recognition library 108 may be considered one and the same. In such an implementation, the anonymized facial recognition library 108 may simply take the place of the feature vector clusters 505. However, in the embodiment illustrated in FIG. 5, the feature vector clusters 505 and the anonymized facial recognition library 108 are both maintained. In particular, the feature vector clusters 505 may include the representative images, as well as some or all of the feature vectors that make up each cluster.

The anonymized ID look-up table 114 may next be constructed as follows. For each cluster, the library construction module 506 may input the representative image to an ML-based facial image identification module 508 for identification of each cluster with one of the panel members. The ML-based facial image identification module 508 may implement an ML-based facial image identification model previously trained for predicting various types or categories of demographic information from input facial images. In accordance with example embodiments, the ML-based facial image identification model may be trained for predicting age and gender, possibly as well as height, from input facial images. In accordance with example embodiments, the ML-based facial image identification model may be, or be implemented with, an artificial neural network, for example. However, other computational techniques may be used as well.

In some embodiments, the ML-based facial image identification model may be able to predict the various types or categories of demographic information from input feature vectors. This capability could eliminate or reduce the need for determining and/or maintaining representative images.

The ML-based facial image identification module 508 may also access demographic data 509 stored or recorded on the monitoring device 500. This may be the same demographic information for the panel that is stored in the demographics database 110 and illustrated in FIG. 3, for example. Thus, for each representative image from the feature vector clusters 505, the output of the ML-based facial image identification module 508 may predict the age and gender, and use the predicted age and gender to identify a most likely match from the demographic data 509. In this way, the ML-based facial image identification module 508 may determine a name ID associated with each representative image and its cluster ID.

In some instances, the ML-based facial image identification module 508 may not be able to uniquely match a predicted age and gender with one panel member's demographic data 509 to an acceptable statistical confidence level. For example, two panel members may be sufficiently similar in appearance to make a satisfactorily-unique identification. There could be other reasons or circumstances that result in uncertain identifications. Some such instances, additional demographic information may be used to help resolve possible ambiguities in identification.

In accordance with example embodiments, the relative heights of a panel members may be inferred from session images by comparing them and deriving estimates among the panel members as they appear in the images. Considering the hypothetical panel of the present discussion as an example, one session image may be identified as Kim with reasonable certainty, while another may appear to be either Kim or Molly with roughly equal certainty. If a comparison of the two images is able to yield an estimate of relative height between the identified Kim image and the ambiguous Kim-or-Molly image, the relative height may enable the ambiguity to be resolved. For example if the relative height indicates that the panel member in the ambiguous Kim-or-Molly image is shorter than the panel member in the identified Kim image, it may be concluded that the ambiguous Kim-or-Molly corresponds to the younger Molly. Conversely, if the relative height indicates that the panel member in the ambiguous Kim-or-Molly image is about the same height as the panel member in the identified Kim image, it may be concluded that the ambiguous Kim-or-Molly corresponds to the older Kim. This is just one example of how relative heights inferred or measured from session images may be used to help resolve otherwise ambiguous identification of session images.

In other instances of ambiguous identification, the ML-based facial image identification module 508 may input the representative image to a panel query module 510, which may then construct a query asking one or more designated panel members to provide a manual identification of the panel member associated with the representative image. The query may be input to a user interface 512 that outputs an ID query 511 to the designated panel member or members. A user-provided ID 513 may then be received at the user interface 512, and passed back through the panel query module 510 to the ML-based facial image identification module 508.

The user interface for issuing the ID query 511 and receiving the user-provided ID 513 may be any suitable interface for electronically communicating with the one or more designated panel members. For example, it could be a graphical user interface on the monitoring device 500, or a web browser on an external tablet, smart phone, PC, or the like, that is communicatively connect to the monitoring device 500. The connection could be via a local area network, or a public internet, for example. The ID query could be an email or text message, for example. In any case, the ID query may omit any actual image, thereby maintaining privacy and anonymity of the panel member associated with the representative image.

As described, the operations relating to manual identification of panel members associated with representative images may generally only need to be invoked when identification by the ML-based facial image identification module 508 does not yield a sufficiently certain result. Accordingly, manual identification may be consider a form of optional operation. This is indicated in FIG. 5 by a dotted rectangle labeled "Panel Query Mode" that encloses the panel query module 510 and the user interface 512.

Once the ML-based facial image identification module 508 determines a name ID for each cluster-either by sufficiently certain prediction or using the panel query mode—it may output the results as name ID-cluster ID associations 507. The anonymized ID look-up table 114 may then be constructed as a table of entries, where each entry is a different one of the name ID-cluster ID associations 507 determined by the ML-based facial image identification module 508.

In accordance with example embodiments, the monitoring device 500 may transmit the anonymized ID look-up table 114 to the audience server 104 via a network interface 518, as indicated. As shown in FIG. 1, the audience server 104 may then store or record the anonymized ID look-up table 114 for use in subsequent audience measurement and analysis operations. Advantageously, the anonymized facial recognition library 108 and the anonymized ID look-up table 114 may both be constructed without any person ever viewing or having access to images of any of the panel members. And to the extent that any images do need to be viewed by a person during the construction of the anonymized facial recognition library 108 and/or the anonymized ID look-up table 114, in connection with the "Panel Query Mode" just described, for example, that person (or persons) would be a panel member (or members), so strict privacy of images may be maintained.

Runtime operation using the anonymized facial recognition library 108 and the anonymized ID look-up table 114 in audience monitoring and measurement is described next.

During runtime operations, runtime-session images 515 of panel members are received at the ML-based feature extraction module 502 from the camera of or connected to the monitoring device 500. The runtime-session images 515 may be, or have been, captured during one or more runtime viewing sessions, each of which may be attended by one or more of the panel members in various combinations. The ML-based feature extraction module 502 may output feature vectors 519 and provide them as input to a cluster assignment module 514, as shown.

The cluster assignment module 514 may access the anonymized facial recognition library 108 and determine which cluster each of the feature vectors 519 belong to. The may be done in the same or similar manner that the clusters were identified. In accordance with example embodiments, a closeness measure of each given feature vector of feature vectors 519 to each cluster may be computed, and the cluster determined to be closest to the given feature vector may be identified as the one to which the given feature vector belongs. For example a cosine or inner product may be computed for each given feature vector of feature vectors 519 with the centroid feature vector of each cluster. The cluster ID of the centroid that yields the largest value of cosine or inner products may then be taken as the cluster ID of given feature vector. In this way, each feature vector of feature vectors 519 may be associated with a known cluster ID, and by extension, with a name ID of a panel member.

The cluster assignment module 514 may provide the cluster IDs of the feature vectors 519 to an audience report generation module 516, which may also receive session program information 517 as input. In accordance with example embodiments, the session program information 517 may include information that identifies what programming is or was being received and/or presented by the TV during the session or sessions associated with the runtime-session images 515. The audience report generation module 516 may then create an audience report 101 and transmit it to the audience measurement server 104 via the network interface 518, as shown.

As described above in connection with FIG. 3, for a given viewing session, the audience report may include a panel ID, session programming information, and cluster IDs associated with the each session in the report. This effectively anonymizes identification of the panel members present during the given session. The audience measurement server 104 may use the cluster IDs in audience report 101 as a look-up in the anonymized ID look-up table 114 to determine the name IDs associate with each session, and use the name IDs to determine the demographic information of the panel members present during any given viewing session. An aggregate of all or some such audience measurement data for one or more panels may provide a basis for various types or forms of audience studies, for example. It may be noted that, audience measurement data may be collected and stored over various time periods and used in historical studies. As such, even session data collected during construction of an anonymized facial recognition library 108 and anonymized ID look-up table 114 may be analyzed after the fact.

Figure 6:
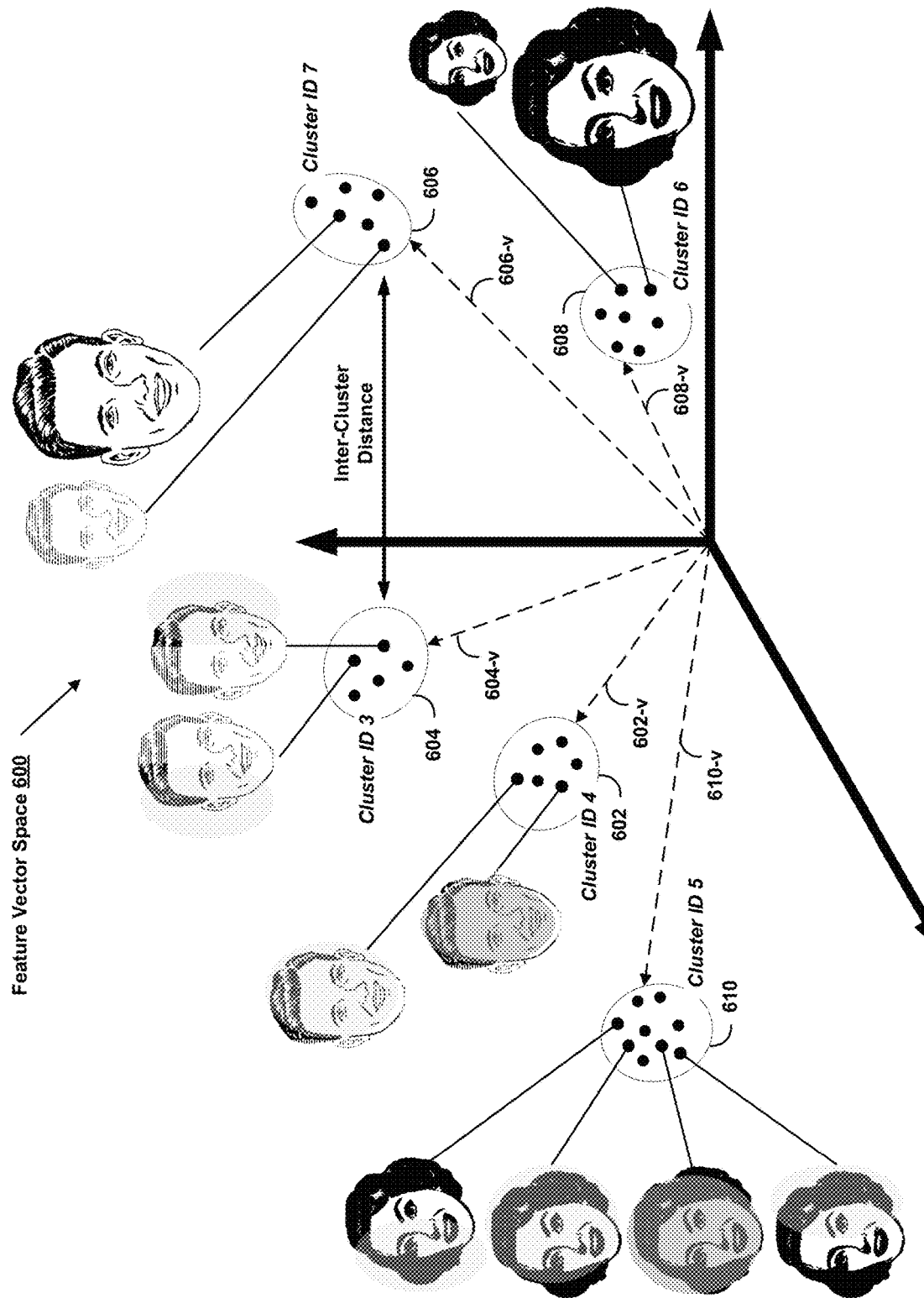
FIG. 6 is a conceptual illustration of clustering of feature vectors in a feature vector space, in accordance with example embodiments.

FIG. 6 is a conceptual illustration of clustering of feature vectors in a feature vector space 600, in accordance with example embodiments. Examples of clusters are shown for only two of the hypothetical panel members in order to avoid overly confusing the graphical depictions in the figure. Specifically, only the clusters for Tom and Sally are shown. The feature vector space 600 is represented as a 3-dimensional space by the orthogonal axes displayed a thick black arrows with a common origin. In practice, feature vector space may have approximately 100-200 dimensions or more, though still typically much less than the dimensionality of images, for example.

In the figure, clusters are represented as respective close groupings of black dots within respective oval-shaped boundaries. A respective dotted arrow from the origin of feature vector space 600 to each cluster represents a respective centroid feature vector of each cluster. An example of an inter-cluster distance is represented as a double arrow between two of the clusters.

By way of example, the six facial images of Tom shown in FIG. 4 evidently fall within three clusters, as indicated by a line from each facial image to a dot in one of the clusters. Thus, in the example illustrated, two facial images of Tom appear to be associated with the cluster 602 with a centroid feature vector 602-v and having and assigned cluster ID 4. Two other facial images of Tom appear to be associated with the cluster 604 with a centroid feature vector 604-v and having and assigned cluster ID 3; and another two facial images of Tom appear to be associated with the cluster 606 with a centroid feature vector 606-v and having and assigned cluster ID 7.

For purposes of conceptual illustration, the two facial images associated with the cluster 602 are represented as sharing similar image-capture conditions; namely different opacities of otherwise similar shading. Similarly, the two facial images associated with the cluster 604 are also represented as sharing similar image-capture conditions; namely similar shading but on opposite sides of the images. And the two facial images associated with the cluster 606 are again represented as sharing similar image-capture conditions; namely similar images captured at apparently different distances from the camera. These illustrations of how different image-capture conditions might manifest as different clusters are intended to convey a conceptual explanation of how clustering may arise, and not necessarily provide a rigorous analytical explanation.

Also by way of example, the six facial images of Sally shown in FIG. 4 evidently fall within two clusters, as indicated by a line from each facial image to a dot in one of the clusters. Thus, in the example illustrated, two facial images of Sally appear to be associated with the cluster 608 with a centroid feature vector 608-v and having and assigned cluster ID 6. Four other facial images of Tom appear to be associated with the cluster 610 with a centroid feature vector 610-v and having and assigned cluster ID 5.

Once more for purposes of conceptual illustration, the two facial images associated with the cluster 608 are represented as sharing similar image-capture conditions; namely similar images captured at apparently different distances from the camera. Similarly, the four facial images associated with the cluster 610 are also represented as sharing similar image-capture conditions; namely all sharing some degree of shading. Again, these illustrations are intended to convey a conceptual explanation of how clustering may arise, and not necessarily provide a rigorous analytical explanation.

As discussed above, while each cluster ID may be associate with just one panel member, each panel member may be associated with more than one cluster. This is illustrated in FIG. 6, and also indicated in the example anonymized facial recognition library 108 shown in FIG. 3. It may be noted that the cluster IDs (3, 4, 7) associated with Tom's name ID of G2 in the anonymized ID look-up table 114 shown in FIG. 3 are also the cluster IDs associated with Tom's representative images in FIG. 6. Likewise, the cluster IDs (5, 6) associated with Sally's name ID of G3 in the anonymized ID look-up table 114 shown in FIG. 3 are also the cluster IDs associated with Sally's representative images in FIG. 6. This illustrates how the clustering is used to determine the associations between the centroid feature vectors and cluster IDs in the anonymized facial recognition library 108, and between the cluster IDs and name IDs that then become the entries in the anonymized ID look-up table 114.

C. Example Artificial Neural Network

As described above, an audience measurement system configured for automated construction of an anonymized facial recognition library may use one or more ANNs to perform such tasks as feature extraction or generation of embedding feature vectors from facial images, and facial image identification. At runtime, the trained ML-based feature extraction model may be applied to session images to generate feature vectors to determine cluster membership. In accordance with example embodiments, an ANN may be trained to extract features and generate embedding feature vectors, and/or to predict various demographic information or characteristics from input facial images.

Figure 7:
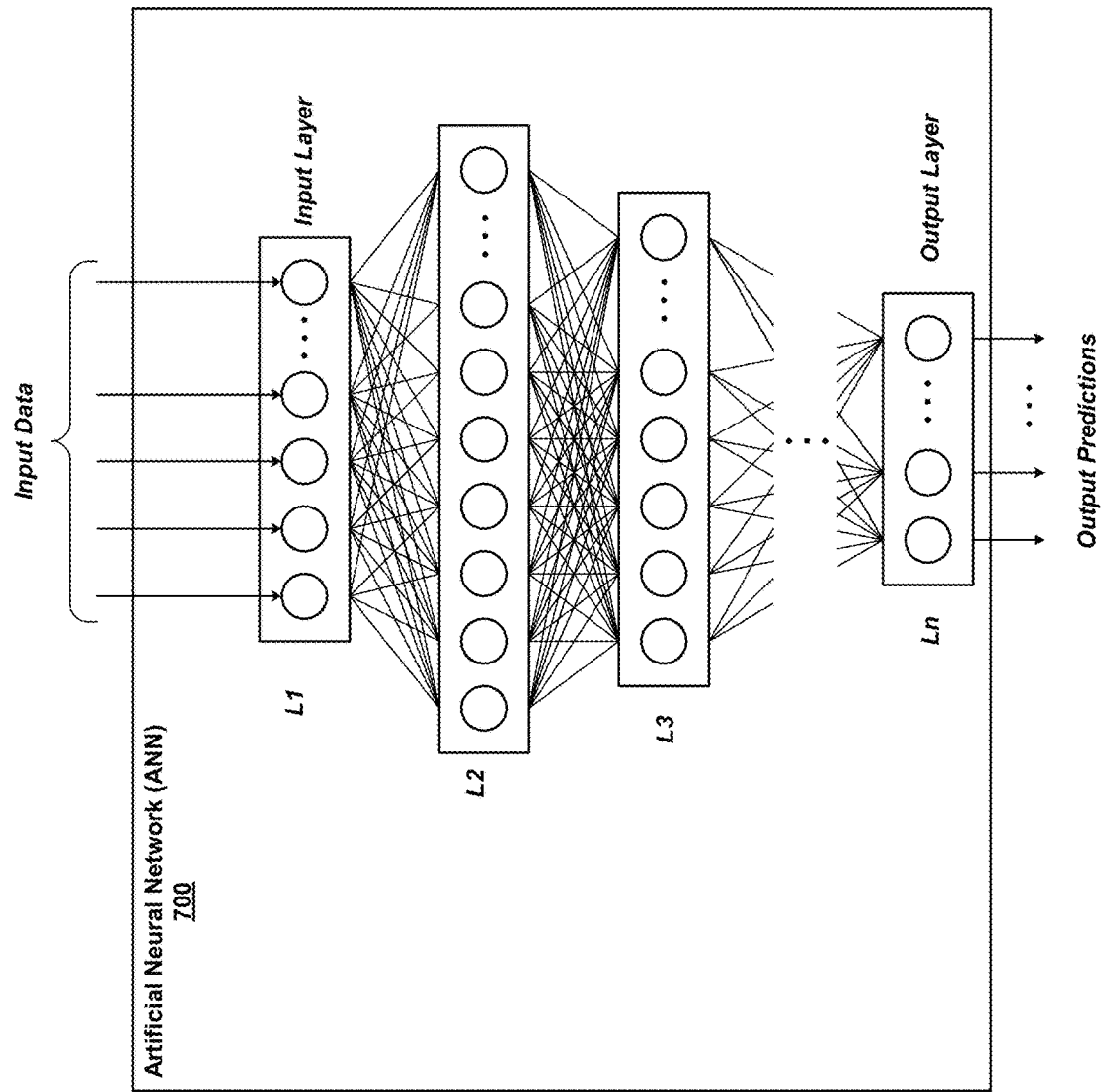
FIG. 7 is an example architecture of an example artificial neural network, in accordance with example embodiments.

FIG. 7 illustrates an example architecture of an example artificial neural network 600, in accordance with example embodiments. As shown, the ANN 700 may be computationally constructed as a plurality of interconnected layers, including an input layer, labeled "L1"; an output layer, labeled "Ln"; and one or more intermediate layers, labeled "L2" and "L3" in this example. The ellipses between L3 and Ln represent one or more possible intermediate layers. In this example, there are n layers, with Ln labeling the nth layer. Each layer may be made up of one or more nodes having inputs and outputs. The inputs of nodes in one layer may be connected to the output of nodes of the preceding layer, except that the inputs to the nodes of the input layer receive input data, and the outputs of the nodes of the output layer provide a prediction that the input data matches one or another type of pattern that the ANN has been trained to recognize. Typically, training for recognition of a particular class of content in a given type of data, such as cats or dogs in image data, for example, may involve inputting training data that represents known or ground-truth (training) examples of the particular class of content for which results are known, and then adjusting parameters (or weights) of the nodes in an ANN learning update procedure, such as back propagation, to maximize a probability that a predicted output by the ANN output (e.g., what the ANN "thinks" the input data represents) matches the training examples.

For some types of applications in which an ANN is used, it may be configured to predict a probability or probabilities that a given input matches one or more elements or classes of elements of a known discrete set of elements or classes of elements. In this context, the ANN or the system in which it is implemented may be referred to as a "classifier," signifying a classification operation. A classifier may also be configured to make an actual selection from among a known discrete set of elements or classes of elements. For other types of applications in which an ANN is used, it may be configured to compute, given an input, a probable continuous value (e.g., a scalar) or set of values (e.g., a vector) as output, possibly together with confidence levels for the predicted output(s). In this context, the ANN or the system in which it is implemented may be considered as performing one or another form of regression analysis. Example embodiments of ML predictors described herein may include or employ either or both types of ANN implementations, in accordance with the descriptions below. Further, other types of ANNs are possible, such as convolutional neural networks (CNNs) and may be used or included in example embodiments of ML predictors described herein.

IV. Example Methods

Figure 8:
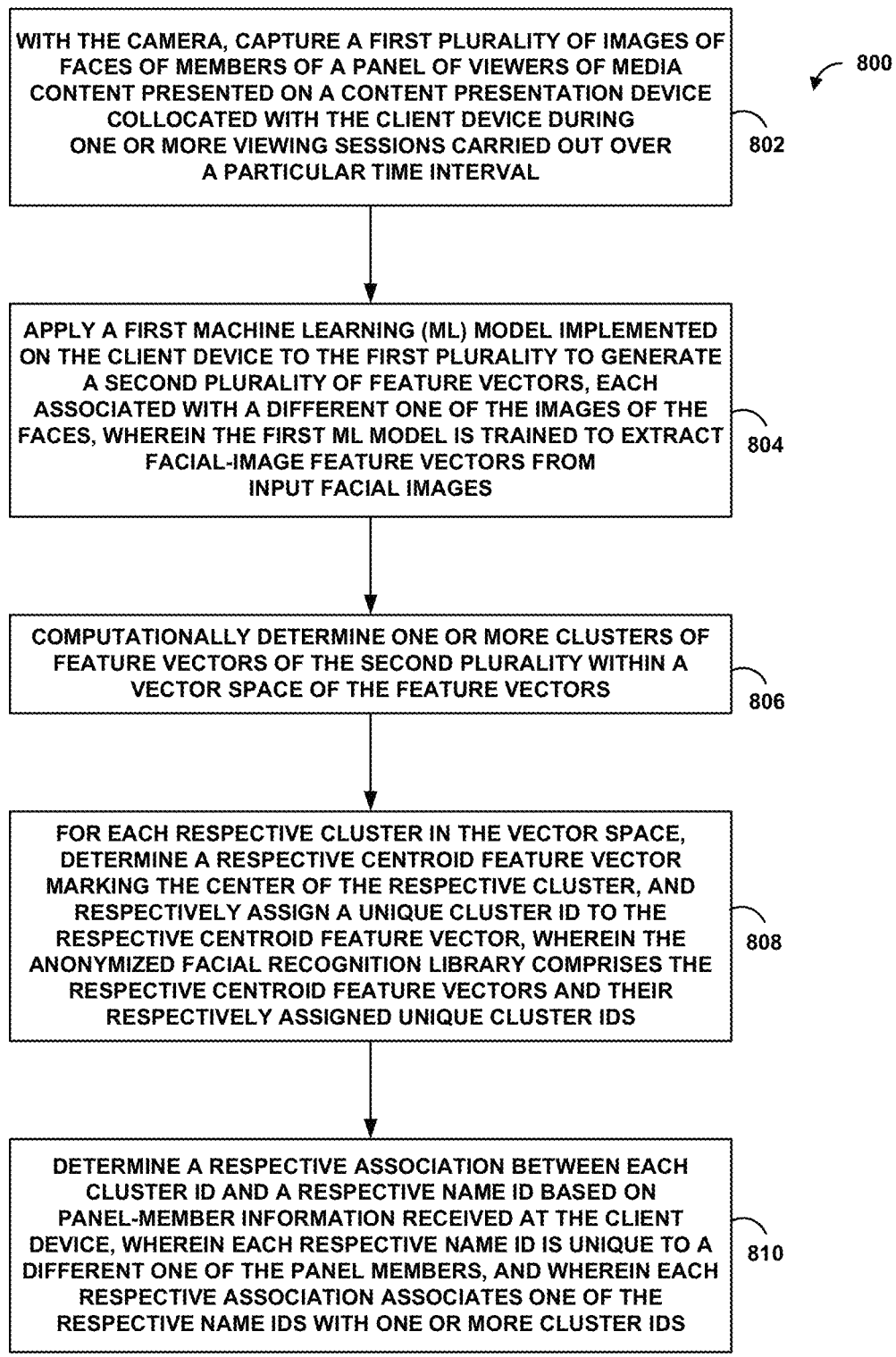
FIG. 8 is a flow chart of an example method of anonymized facial recognition library construction, in accordance with example embodiments.

FIG. 8 illustrates a flow chart of an example method 800 for automated construction of an anonymized facial recognition library. The example method may be carried out by a client device having a camera and one or more processors, such as the client device 100 shown in FIG. 1, and/or the monitoring device 500 shown in FIG. 5. The example method 800 may be implemented as computer-readable instructions stored in one or another form of memory (such as volatile or nonvolatile memory) of the client device. An example of a computing system is shown in FIG. 2. When executed by one or more processors of the client device, the instructions may cause the client device to carry out operations of the example method 800. The computer-readable instructions may additionally be stored on a non-transitory computer readable medium, which may be used, for example, for loading the instructions into the memory of the computing system. In some examples, the non-transitory computer-readable medium could be the memory of the computing system.

Block 802 may involve the camera capturing a first plurality of images of faces of members of a panel of viewers of media content presented on a content presentation device collocated with the client device during one or more viewing sessions carried out over a particular time interval. For example, the content presentation device may be a TV, and the media content could be broadcast TV programming or streaming video, among other non-limiting examples. The particular time interval may span the one or more viewing sessions, for example.

Block 804 may involve applying a first machine learning (ML) model implemented on the client device to the first plurality to generate a second plurality of feature vectors. Each feature vector may be associated with a different one of the images of the faces. In accordance with example embodiments, the first ML model may be trained to extract facial-image feature vectors from images that contain one or more faces. The first ML model may correspond to the ML-based feature extraction model discussed above.

Block 806 may involve computationally determining one or more clusters of feature vectors of the second plurality within a vector space of the feature vectors.

Block 808 may involve determining a respective centroid feature vector for each respective cluster in the vector space and respectively assigning a unique cluster identifier (ID) to the respective centroid feature vector. Each centroid feature vector may mark the center of the respective cluster. In accordance with example embodiments, the respective centroid feature vectors and their respectively assigned unique cluster IDs may correspond to the entries of the anonymized facial recognition library.

Finally, block 810 may involve determining a respective association between each cluster ID and a respective name ID based on panel-member information received at the client device. Each respective name ID may be unique to a different one of the panel members, while each respective association may associate one of the respective name IDs with one or more cluster IDs. In accordance with example embodiments, the respective associations may correspond to entries of the anonymized ID look-up table, described in connection with FIG. 1, for example.

In accordance with example embodiments, capturing the first plurality of images of the faces of members of the panel during the one or more viewing may entail capturing at least one facial image of each of those panel members present at the respective viewing session during each respective viewing session. Further, computationally determining the one or more clusters of the feature vectors of the second plurality may entail successively aggregating the feature vectors generated from each successive viewing session into a session group of feature vectors, and then successively determining one or more candidate clusters of feature vectors for the session group after each aggregation. The aggregation and successive determinations of clusters may thus correspond to iteratively determining clusters as more and more feature vectors are obtained over more and more sessions, as described above.

In accordance with example embodiments, computationally determining the one or more clusters of the feature vectors of the second plurality further entail determining a particular successive viewing session beyond which the respective centroids of candidate clusters determined for each successive aggregation remain unchanged to within a threshold deviation. This may be considered as corresponding to the stabilization of clusters described above. The particular time interval may then be considered as spanning at least all of the successive viewing sessions up to and including the particular successive viewing session.

In accordance with example embodiments, capturing the first plurality of images of the faces of members of the panel may involve capturing one or more versions of facial images of each of the members of the panel over a course of the one or more viewing sessions. The one or more versions of facial images of any given panel member may correspond to one or more images of the any given panel member's face captured under different capture conditions. Non-limiting examples of capture conditions may include lighting, distance from the camera to the any given panel member, physical pose of the any given panel member, and/or physical posture of the any given panel member. Further, computationally determining the one or more clusters of the feature vectors of the second plurality may involve determining respective clusters of feature vectors, each representing one or more versions of the given panel member's facial image that are sufficiently similar for their corresponding feature vectors to cluster in the vector space.

In accordance with example embodiments, computationally determining the one or more clusters of the feature vectors of the second plurality may entail determining respective locations of each of the second plurality of feature vectors within the vector space. Respective regions in the vector space may then be identified such that each region may have a respective group of feature vectors all within a first threshold distance from a respective statistical centroid of the respective group. The respective statistical centroid may be separated from every other respective group's statistical centroid by at least a second threshold distance.

In accordance with example embodiments, determining the respective association between each cluster ID and the respective name ID based on the panel-member information received at the client device may entail presenting a digital image corresponding a representative feature vector of the respective cluster in an interactive user interface for at least one respective cluster. The interactive user interface is implemented in an application program of an end-user computing device communicatively connected to the client device. Then, responsive to one or more prompts presented in the interactive user interface requesting an identifying name for each presented digital image, input associating each respective name ID with one or more respective cluster IDs of the presented digital images may be received via the interactive interface.

In accordance with example embodiments, determining the respective association between each cluster ID and the respective name ID may involve receiving panel-member information including the respective name ID, age and identified gender of each panel member. Then, for each respective cluster, a representative digital image corresponding to a representative feature vector of the respective cluster may be determined. The representative feature vector may be one of the respective centroid feature vector of the respective cluster, or one of the feature vectors of the respective cluster. A statistically most likely match between each representative digital image and the age and identified gender of a different one of the panel members may next be predicted by applying a second ML model implemented on the client device to the received panel-member information and to the representative digital image of each respective cluster. The second ML model may trained to predict statistical matches between images of people and age and identified gender of the people. For each match above a threshold likelihood, the cluster ID of the representative feature vector may be associated with the respective name ID of the age and identified gender of the predicted matching panel member. For each match not above the threshold likelihood, a designated panel member may be prompted via an interactive interface for an identifying name associated with an image derived from the representative digital image. The second ML model may correspond to the ML-based facial image identification model discussed above.

In further accordance with example embodiments, relative heights of images of the panel members derived from the representative digital images may be determined, and the heights may be used to adjust the likelihood of the predicted matches.

In accordance with example embodiments, the client device may be communicatively connected with a remote audience measurement server device. In this configuration the example method 800 may further involve providing the respective associations between the cluster IDs and the respective name IDs to the audience measurement server. Then, additionally operations may include capturing one or more audience images of one or more panel members who are present at each of one or more target viewing sessions during which media content is presented on the content presentation device. The target viewing sessions may be considered as corresponding to the runtime viewing sessions discussed above. The first ML model may then be applied to the one or more audience images to generate one or more corresponding audience feature vectors respectively associated with the one or more audience images. A determination may then be made of which respective clusters the one or more audience feature vectors belong to. Then one or more audience reports may then be transmitted to the audience measurement server. The one or more audience reports may include information correlating the one or more target viewing sessions with (i) the cluster IDs of the determined respective clusters, and/or (ii) the name IDs of the panel members present at the one or more target viewing sessions. Additionally, the one or more target viewing sessions may consist of one or more viewing sessions during the particular time interval, and/or one or more viewing sessions subsequent to the particular time interval.

V. Example Variations

Although the examples and features described above have been described in connection with specific entities and specific operations, in practice, there are likely to be many instances of these entities and many instances of these operations being performed, perhaps contemporaneously or simultaneously, on a large scale.

In addition, although some of the acts described in this disclosure have been described as being performed by a particular entity, the acts can be performed by any entity, such as those entities described in this disclosure. Further, although the acts have been recited in a particular order, the acts need not be performed in the order recited. However, in some instances, it can be desired to perform the acts in the order recited. Further, each of the acts can be performed responsive to one or more of the other acts. Also, not all of the acts need to be performed to achieve one or more of the benefits provided by the disclosed features, and therefore not all of the acts are required.

And although certain variations have been described in connection with one or more examples of this disclosure, these variations can also be applied to some or all of the other examples of this disclosure as well.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method carried out by a computing system comprising one or more processors, the method comprising:

applying, by the computing system, a first machine learning (ML) model to a first plurality of images of faces of members of a panel of viewers of media content presented during one or more viewing sessions carried out over a particular time interval, to generate a second plurality of feature vectors, each associated with a different one of the images of the faces, wherein the first ML model is trained to extract facial-image feature vectors from images that contain one or more faces;

computationally determining, by the computing system, one or more clusters of feature vectors of the second plurality within a vector space of the feature vectors;

for each respective cluster in the vector space, determining by the computing system a respective centroid feature vector marking the center of the respective cluster, and respectively assigning by the computing system a unique cluster identifier (ID) to the respective centroid feature vector;

generating, by the computing system, an anonymized facial recognition library comprising the respective centroid feature vectors and their respectively assigned unique cluster IDs; and determining, by the computing system, a respective association between each cluster ID and a respective name ID, wherein each respective name ID is unique to a different one of the panel members, and wherein each respective association associates one of the respective name IDs with one or more cluster IDs.

2. The method of claim 1, wherein computationally determining the one or more clusters of the feature vectors of the second plurality comprises:

successively aggregating the feature vectors generated from each successive viewing session of the one or more viewing sessions into a session group of feature vectors; and successively determining one or more candidate clusters of feature vectors for the session group after each aggregation.

3. The method of claim 2, wherein computationally determining the one or more clusters of the feature vectors of the second plurality further comprises:

detecting cluster stability by determining a particular successive viewing session beyond which the respective centroids of candidate clusters determined for each successive aggregation remain unchanged to within a threshold deviation, wherein the particular time interval spans at least all of the successive viewing sessions up to and including the particular successive viewing session.

4. The method of claim 1, wherein the first plurality of images of the faces of members of the panel of viewers of the media content presented during the one or more viewing sessions carried out over the particular time interval comprises one or more versions of facial images of each of the members of the panel over a course of the one or more viewing sessions, wherein the one or more versions of facial images of any given panel member correspond to one or more images of the any given panel member's face captured under different capture conditions, the capture conditions being at least one of lighting, distance from the camera to the any given panel member, physical pose of the any given panel member, or physical posture of the any given panel member, and wherein computationally determining the one or more clusters of the feature vectors of the second plurality comprises determining respective clusters of feature vectors, each representing one or more versions of the given panel member's facial image that are sufficiently similar for their corresponding feature vectors to cluster in the vector space.

5. The method of claim 1, wherein computationally determining the one or more clusters of the feature vectors of the second plurality comprises:

determining respective locations of each of the second plurality of feature vectors within the vector space; and identifying respective regions in the vector space, each region having a respective group of feature vectors all within a first threshold distance from a respective statistical centroid of the respective group, and the respective statistical centroid being separated from every other respective group's statistical centroid by at least a second threshold distance.

6. The method of claim 1, wherein determining the respective association between each cluster ID and the respective name ID comprises, for each cluster ID assigned to a respective cluster:

presenting a digital image corresponding to a representative feature vector of the respective cluster in an interactive user interface, wherein the interactive user interface is implemented in an application program of an end-user computing device;

responsive to the interactive user interface requesting an identifying name for each presented digital image, receiving via the interactive interface input associating the respective name ID with the presented digital image; and based on the received input, associating the respective name ID with the cluster ID.

7. The method of claim 1, wherein determining the respective association between each cluster ID and the respective name ID comprises:

receiving panel-member information comprising the respective name ID, age and identified gender of each panel member;

for each respective cluster, determining a representative digital image corresponding to a representative feature vector of the respective cluster, wherein the representative feature vector is one of the respective centroid feature vector of the respective cluster, or one of the feature vectors of the respective cluster;

computationally predicting a statistically most likely match between each representative digital image and the age and identified gender of a different one of the panel members, by applying a second ML model to the received panel-member information and to the representative digital image of each respective cluster, wherein the second ML model is trained to predict statistical matches between images of people and age and identified gender of the people;

for each match above a threshold likelihood, associating the cluster ID of the representative feature vector corresponding to the representative image with the respective name ID of the age and identified gender of the predicted matching panel member; and for each match not above the threshold likelihood, prompting a designated panel member via an interactive interface for an identifying name associated with the representative digital image.

8. The method of claim 7, wherein the panel-member information furthers comprises a height of each panel member, and wherein the method further comprises:

determining relative heights of images of the panel member derived from the representative digital images; and using the relative heights to adjust the likelihood of the predicted matches.

9. The method of claim 1, further comprising:

providing the respective associations between the cluster IDs and the respective name IDs to an audience measurement server;

for each of one or more target viewing sessions at which one or more panel members is present and at which media content is presented, applying the first ML model to one or more audience images of the one or more panel members to generate one or more corresponding audience feature vectors respectively associated with the one or more audience images, and determining which respective clusters the one or more audience feature vectors belong to; and transmitting, to the audience measurement server, one or more audience reports comprising information correlating the one or more target viewing sessions with at least one of: (i) the cluster IDs of the determined respective clusters, or (ii) the name IDs of the panel members present at the one or more target viewing sessions, wherein the one or more target viewing sessions consist of at least one of: one or more viewing sessions during the particular time interval, or one or more viewing sessions subsequent to the particular time interval.

10. A computing system comprising:

one or more processors; and memory storing instructions that, when executed by the one or more processors, cause the computing system to carry out operations including:

applying a first machine learning (ML) model to a first plurality of images of faces of members of a panel of viewers of media content presented, during one or more viewing sessions carried out over a particular time interval, on a content presentation device, to generate a second plurality of feature vectors, each associated with a different one of the images of the faces, wherein the first ML model is trained to extract facial-image feature vectors from images that contain one or more faces, computationally determining one or more clusters of feature vectors of the second plurality within a vector space of the feature vectors, for each respective cluster in the vector space, determining a respective centroid feature vector marking the center of the respective cluster, and respectively assigning a unique cluster identifier (ID) to the respective centroid feature vector, generating an anonymized facial recognition library comprising the respective centroid feature vectors and their respectively assigned unique cluster IDs, and determining a respective association between each cluster ID and a respective name ID, wherein each respective name ID is unique to a different one of the panel members, and wherein each respective association associates one of the respective name IDs with one or more cluster IDs.

11. The computing system of claim 10, wherein computationally determining the one or more clusters of the feature vectors of the second plurality comprises:

successively aggregating the feature vectors generated from each successive viewing session of the one or more viewing sessions into a session group of feature vectors; and successively determining one or more candidate clusters of feature vectors for the session group after each aggregation.

12. The computing system of claim 11, wherein computationally determining the one or more clusters of the feature vectors of the second plurality further comprises:

detecting cluster stability by determining a particular successive viewing session beyond which the candidate clusters determined for each successive aggregation remain unchanged to within a threshold deviation, wherein the particular time interval spans at least all of the successive viewing sessions up to and including the particular successive viewing session.

13. The computing system of claim 10, wherein the first plurality of images of the faces of members of the panel of viewers of the media content presented during the one or more viewing sessions carried out over the particular time interval comprises one or more versions of facial images of each of the members of the panel over a course of the one or more viewing sessions, wherein the one or more versions of facial images of any given panel member correspond to one or more images of the any given panel member's face captured under different capture conditions, the capture conditions being at least one of lighting, distance from the camera to the any given panel member, physical pose of the any given panel member, or physical posture of the any given panel member, and wherein computationally determining the one or more clusters of the feature vectors of the second plurality comprises determining respective clusters of feature vectors, each representing one or more versions of the given panel member's facial image that are sufficiently similar for their corresponding feature vectors to cluster in the vector space.

14. The computing system of claim 10, wherein computationally determining the one or more clusters of the feature vectors of the second plurality comprises:

determining respective locations of each of the second plurality of feature vectors within the vector space; and identifying respective regions in the vector space, each region having a respective group of feature vectors all within a first threshold distance from a respective statistical centroid of the respective group, and the respective statistical centroid being separated from every other respective group's statistical centroid by at least a second threshold distance.

15. The computing system of claim 10, wherein determining the respective association between each cluster ID and the respective name ID comprises, for each cluster ID assigned to a respective cluster:

presenting a digital image corresponding to a representative feature vector of the respective cluster in an interactive user interface, wherein the interactive user interface is implemented in an application program of an end-user computing device;

responsive to the interactive user interface requesting an identifying name for each presented digital image, receiving via the interactive interface input associating the respective name ID with the presented digital image; and based on the received input, associating the respective name ID with the cluster ID.

16. The computing system of claim 10, wherein determining the respective association between each cluster ID and the respective name ID comprises:

receiving panel-member information comprising the respective name ID, age and identified gender of each panel member;

for each respective cluster, determining a representative digital image corresponding to a representative feature vector of the respective cluster, wherein the representative feature vector is one of the respective centroid feature vector of the respective cluster, or one of the feature vectors of the respective cluster;

computationally predicting a statistically most likely match between each representative digital image and the age and identified gender of a different one of the panel members, by applying a second ML model to the received panel-member information and to the representative digital image of each respective cluster, wherein the second ML model is trained to predict statistical matches between images of people and age and identified gender of the people;

for each match above a threshold likelihood, associating the cluster ID of the representative feature vector corresponding to the representative image with the respective name ID of the age and identified gender of the predicted matching panel member; and for each match not above the threshold likelihood, prompting a designated panel member via an interactive interface for an identifying name associated with the representative digital image.

17. The computing system of claim 16, wherein the panel-member information furthers comprises a height of each panel member, and wherein the operations further include:

determining relative heights of images of the panel member derived from the representative digital images; and using the relative heights to adjust the likelihood of the predicted matches.

18. The computing system of claim 10, wherein the operations further include:

providing the respective associations between the cluster IDs and the respective name IDs to an audience measurement server;

for each of one or more target viewing sessions at which one or more panel members is present and at which media content is presented, applying the first ML model to one or more audience images of the one or more panel members to generate one or more corresponding audience feature vectors respectively associated with the one or more audience images, and determining which respective clusters the one or more audience feature vectors belong to; and transmitting, to the audience measurement server, one or more audience reports comprising information correlating the one or more target viewing sessions with at least one of: (i) the cluster IDs of the determined respective clusters, or (ii) the name IDs of the panel members present at the one or more target viewing sessions, wherein the one or more target viewing sessions consist of at least one of: one or more viewing sessions during the particular time interval, or one or more viewing sessions subsequent to the particular time interval.

19. A non-transitory computer-readable medium having instructions stored thereon that, when carried out by one or more processors of a computing system, cause the computing system to carry out operations including:

applying a first machine learning (ML) model implemented to a first plurality of images of faces of members of a panel of viewers of media content presented, during one or more viewing sessions carried out over a particular time interval, on a content presentation device, to generate a second plurality of feature vectors, each associated with a different one of the images of the faces, wherein the first ML model is trained to extract facial-image feature vectors from images that contain one or more faces, computationally determining one or more clusters of feature vectors of the second plurality within a vector space of the feature vectors, for each respective cluster in the vector space, determining a respective centroid feature vector marking the center of the respective cluster, and respectively assigning a unique cluster identifier (ID) to the respective centroid feature vector, generating an anonymized facial recognition library comprising the respective centroid feature vectors and their respectively assigned unique cluster IDs, and determining a respective association between each cluster ID and a respective name ID, wherein each respective name ID is unique to a different one of the panel members, and wherein each respective association associates one of the respective name IDs with one or more cluster IDs.

20. The non-transitory computer-readable medium of claim 19, wherein the operations further include:

providing the respective associations between the cluster IDs and the respective name IDs to an audience measurement server;

for each of one or more target viewing sessions at which one or more panel members is present and at which media content is presented, applying the first ML model to one or more audience images of the one or more panel members to generate one or more corresponding audience feature vectors respectively associated with the one or more audience images, and determining which respective clusters the one or more audience feature vectors belong to; and transmitting to the audience measurement server one or more audience reports comprising information correlating the one or more target viewing sessions with at least one of: (i) the cluster IDs of the determined respective clusters, or (ii) the name IDs of the panel members present at the one or more target viewing sessions, wherein the one or more target viewing sessions consist of at least one of: one or more viewing sessions during the particular time interval, or one or more viewing sessions subsequent to the particular time interval.

\* \* \* \* \*